(12) United States Patent
Ma et al.

(10) Patent No.: US 12,113,881 B2
(45) Date of Patent: Oct. 8, 2024

(54) NETWORK PROCESSOR WITH COMMAND-TEMPLATE PACKET MODIFICATION ENGINE

(71) Applicant: Intel Corporation, Santa Clara, CA (US)

(72) Inventors: Weiqiang Ma, Chandler, AZ (US); Atul Kwatra, Gilbert, AZ (US); Stephen T. Palermo, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 272 days.

(21) Appl. No.: 17/485,069

(22) Filed: Sep. 24, 2021

(65) Prior Publication Data

US 2022/0014608 A1    Jan. 13, 2022

Related U.S. Application Data

(63) Continuation-in-part of application No. PCT/US2020/067007, filed on Dec. 24, 2020.
(Continued)

(51) Int. Cl.
*H04L 69/18* (2022.01)
*H04L 69/08* (2022.01)

(52) U.S. Cl.
CPC .............. *H04L 69/18* (2013.01); *H04L 69/08* (2013.01)

(58) Field of Classification Search
CPC ......... H04L 69/18; H04L 69/08; H04L 69/12; H04L 49/3063; H04L 69/10; G06F 9/3867; G06F 9/3885
See application file for complete search history.

(56) References Cited

U.S. PATENT DOCUMENTS 11,157,954 B1 * 10/2021 Belanger ............ G06Q 30/0201
2013/0272272 A1    10/2013 Kedem et al.
(Continued)

FOREIGN PATENT DOCUMENTS

CN    110324437 A * 10/2019
KR    20160056571 A * 5/2016
(Continued)

OTHER PUBLICATIONS

"End-to-End Delay, Throughput, and Performance Analysis of Satellite-UMTS Telecommunication Networks", Proceeding of the IEEE 28thCanadian Conference on Electrical and Computer EngineeringHalifax, Canada, May 3-6, 2015, (May 2015), 5 pgs.
(Continued)

*Primary Examiner* — Shailendra Kumar
(74) *Attorney, Agent, or Firm* — Schwegman Lundberg & Woessner, P.A.

(57) ABSTRACT

Various approaches for the packet processing, and the use of templates for generating modification commands for packet processing, are discussed herein. In an example, operations performed by network packet processing circuitry include: obtaining a stream of packets; obtaining a packet modification template that provides at least one command to insert content within the packets and change the packets according to an output format of a network protocol; receiving parameters to modify the packet modification template; and applying the packet modification template to modify the packets. In further examples, application of the packet modification template is performed using multiple processing components arranged in parallel groups of serial pipelines, each of the serial pipelines applying a portion of the packet modification template within at least a first stage and a second stage in each of the serial pipelines.

25 Claims, 13 Drawing Sheets

Related U.S. Application Data

(60) Provisional application No. 63/129,355, filed on Dec. 22, 2020.

(56) References Cited

U.S. PATENT DOCUMENTS

| | | | |
|---|---|---|---|
| 2015/0003253 A1 | 1/2015 | Wolfner et al. | |
| 2016/0183139 A1 | 6/2016 | Meredith et al. | |
| 2018/0176656 A1 | 6/2018 | Baudoin et al. | |
| 2019/0029074 A1* | 1/2019 | Inoue | H04W 4/38 |
| 2019/0058522 A1* | 2/2019 | Haley | H04B 7/18532 |
| 2019/0068742 A1 | 2/2019 | Harrington et al. | |
| 2020/0007227 A1 | 1/2020 | Becker et al. | |
| 2020/0059294 A1 | 2/2020 | Qin et al. | |
| 2020/0344847 A1 | 10/2020 | Nardini et al. | |
| 2021/0258284 A1* | 8/2021 | Pope | H04L 63/029 |
| 2021/0385169 A1* | 12/2021 | Urman | H04L 1/08 |

FOREIGN PATENT DOCUMENTS

| | | |
|---|---|---|
| WO | 2019118381 | 6/2019 |
| WO | 2021221736 | 11/2021 |

OTHER PUBLICATIONS

"International Application Serial No. PCT US2020 067007, Invitation to Pay Additional Fees mailed Nov. 23, 2021", 7 pgs.

Volk, Florian, "Satellite Integration into 5G: Accent on First Over-The-Air Tests of an Edge Node Concept with Integrated Satellite Backhaul", Future Internet MDPI, (Sep. 5, 2019), 17 pgs.

"International Application Serial No. PCT US2020 067007, International Search Report mailed Jan. 4, 2022", 5 pgs.

"International Application Serial No. PCT US2020 067007, Written Opinion mailed Jan. 4, 2022", 7 pgs.

Oltjon, Kodheli, "Satellite Communications in the New Space Era: A Survey and Future Challenges", arXiv:2002.0881 lvl, https: arxiv.org abs 2002.08811vl, (Feb. 2020), 5-36.

* cited by examiner

NETWORK PROCESSOR WITH COMMAND-TEMPLATE PACKET MODIFICATION ENGINE

RELATED APPLICATIONS

This application is a continuation in part under 35 U.S.C. § 111(a) and claims benefit of priority to International Patent Application Serial No. PCT/US2020/067007, filed Dec. 24, 2020, which claims the benefit of priority to U.S. Provisional Application Ser. No. 63/129,355, filed Dec. 22, 2020, all of which are incorporated herein by reference in their entirety.

TECHNICAL FIELD

Embodiments described herein generally relate to network communication scenarios involved with packet processing and related networking technologies.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

OVERVIEW

Figure 1A:
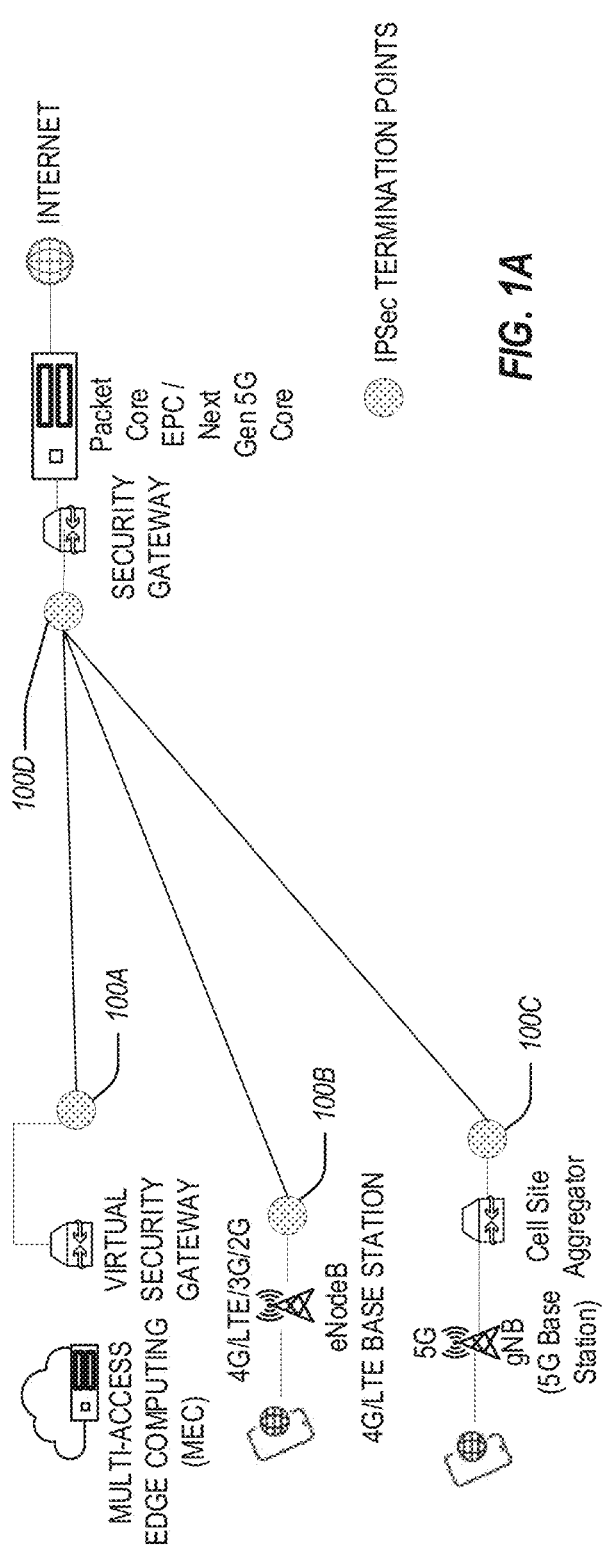
FIGS. 1A and 1B illustrates an overview of terrestrial and satellite scenarios for packet processing, according to an example.

The following disclosure addresses various aspects of connectivity and network data processing, relevant to a variety of network communication settings. Specifically, some of the techniques discussed herein are relevant for packet processing performed by simplified hardware for power and space constricted deployments including on-board Satellite hardware for non-terrestrial networks (e.g., low earth orbit (LEO) or very low earth orbit (VLEO) satellite constellation) and constellations. Other of the techniques discussed herein are relevant to packet processing in terrestrial networks, such as with the use of network processing hardware at various network termination points. Similarly, the techniques discussed herein may be applicable to network packet processing operations having both non-terrestrial and terrestrial aspects.

In the context of many network deployments, service providers are embracing the use of Internet Protocol Security (IPSec) to secure the path of infrastructure traffic from Edge devices and system to the network Core. Likewise, Datagram Transport Layer Security (DTLS) is a protocol that has become widely used to secure datagram-based communications among many network entities. IPSec and DTLS require many packet modifications for each session flow requiring the use of packet processing engines. Such modifications introduce latencies between the packet flow termination points, which may even impact the ability for service providers to meet required service latencies (e.g., 5G requirements such as 5G URLLC, introduced in 5G to support use cases with extremely low latencies, including <1 ms latencies).

With network protocols such as IPSec, DTLS, etc., packets generally need to be modified with certain operations (e.g., add or remove header, add or remove fields, encrypted or decrypted, authenticated, etc.) before packet transmission or after packet reception. To obtain the high throughput required by modern networking applications in conventional systems, a large number of dedicated network processing engines may need to operate in parallel to perform these packet modification operations. The following systems and methods provide an enhanced approach that significantly improves latency, power, and die area constraints for these and other packet processing operations. Specifically, the following systems and methods utilize a command-template based mechanism that eliminates the need for multiple network processing engines to process and modify such packets.

The following systems and methods provide an approach that can reduce the latencies introduced from securing edge-to-core traffic (e.g., in a 5G network) by using a single engine with pre-determined packet templates instead of multiple packet engines. By reducing the number of packet engines, fewer arithmetic logic units (ALUs) are used, thus reducing network process design complexity, reducing circuitry area, reducing power, and ultimately allowing service providers to meet 5G latency requirements at the edge. In specific implementation, ALU count is reduced by some exponent of 2 (e.g., 32 or 64 fewer ALUs) while allowing the execution of the same packet operations.

Figure 1B:
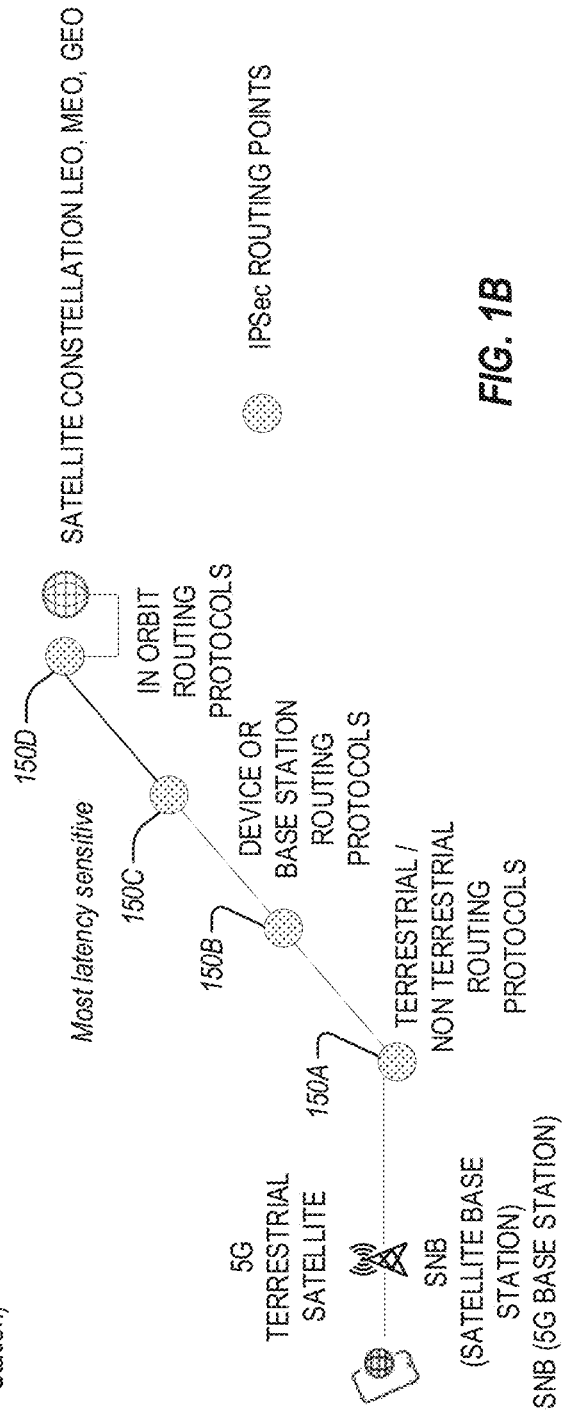

FIGS. 1A and 1B depict example terrestrial and satellite scenarios for packet processing. Specifically, FIG. 1A shows IPSec aggregation points 100A-D used in typical 4G/LTE and 5G networks, and FIG. 1B shows an example routing points 150A-D used in typical satellite communication networks. (The use of IPSec is provided for illustration purposes only, as the following approaches are applicable to other network protocols and other types of packet modifications, including proprietary communication protocols such as those required to convert or communicate data within a satellite network). Additionally, FIG. 1B illustrates a hierarchical use case for command templates. Such usage of templates may be beneficial in constrained environments especially as less power and space is available. In this scenario, routing point 150A may use less templatization, whereas more templatization may be needed with routing point 150D, especially as packet handling compute resources are more constrained with on-board satellite hardware.

As noted below, the following approaches reduce the overall complexity of handling necessary dynamic packet modifications while templating standard modifications to packets. Such approaches may be implemented in smart-NICs, network processors, infrastructure processing units (IPUs) and data processing units (DPUs), or even field-programmable gate array (FPGA) implementations. Such approaches may provide significant benefits to use in satellite network processing or in other latency-sensitive settings. Further, such approaches may enable routing and packet processing to be dynamically implemented on-board of a low-power satellite vehicle (e.g., with on-board packet manipulation), even at satellites which have processing limitations or power constraints (e.g., solar powered).

In the context of FIG. 1A, without the use of the presently described template packet modifier, higher latency will occur. Such higher latency in conventional systems is caused from multiple unique packet processing engines (e.g., up to 32 ALUs) needed to perform network processing, and the time it takes for each packet processing engine to perform its respective operation. Thus, for IPSec used in 5G Edge-to-Core, because of per packet modification, there may be approximately 64 modifications per approximately 30 flows. With use of the following template-based packet modifier, latency is reduced by using a single packet engine with substitute templates, which only requires use of one common engine (e.g., one ALU operating as the sole ALU).

Likewise, a latency sensitive environment is depicted in FIG. 1B. Within the satellite constellation, various routing protocols may be applied by a respective satellite to adapt or modify a data flow. For instance, an LEO:FSA algorithm (Finite State Automata) may be used at a satellite to determine maximum efficiencies of inter-satellite links. Also, a satellite may use an Explicit Load Balancing (ELB) algorithm to establish inter-satellite links that allow neighboring satellite entities (different satellites in the same or different constellations) to exchange information. The LEO satellite network may also provide Priority Adaptive Routing (e.g., using a grid for a network shortest path). Other dynamic service pathways that are established among satellites, satellite constellations, and at different levels or layers of orbiting networks (e.g., at different altitudes), may also be possible and are not depicted for simplicity. Thus, the need for a variety of network processing at the satellite vehicle may occur even if the satellite network is used as a basic relay between ground entities (e.g., with point-to-point network traffic).

The following template-based approach offers a number of benefits for handling packet processing operations within mixed terrestrial and non-terrestrial networks. As a simple example, different templates may be used depending on a location or a type of routing to be performed. Such templates may be used even in extreme latency and minimal processing setting, such as with use of non-terrestrial in-orbit (on-board satellite vehicle) hardware processing having limited hardware capabilities, or at other limited hardware located at the network boundary, at network access points, or in-orbit points.

Without a template packet modifier, higher latency can be experienced especially for in-orbit routing protocols. In contrast, with the following template packet modifier, there is less latency and fewer hardware components via the use of a single packet engine. The use of a single packet engine with a template substitution enables use of one common engine that is adaptable for routing based on location, regardless of whether applying processing operations in terrestrial or satellite networks (and, whether such processing operations are applied at terrestrial or satellite hardware locations).

Figure 2:
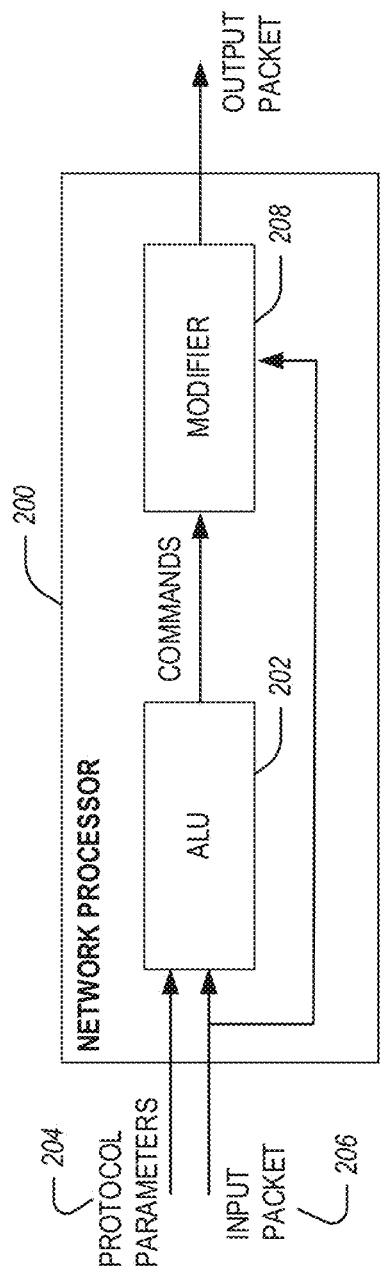
FIGS. 2 and 3 illustrate packet processing architectures used for edge computing, according to an example.
Figure 3:
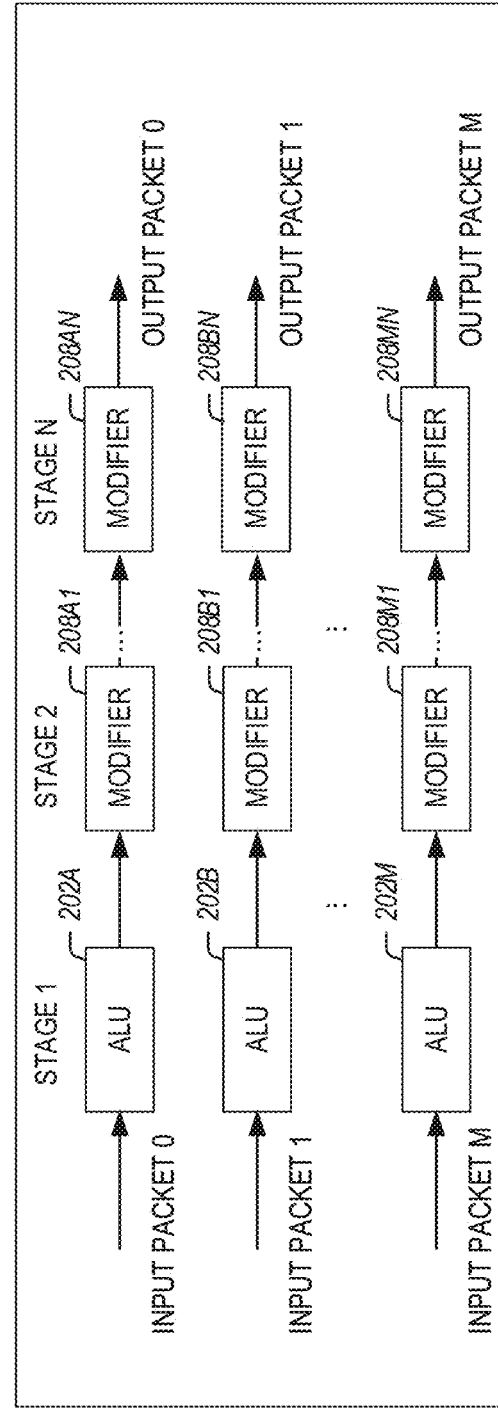

FIGS. 2 and 3 illustrate packet processing architectures used for edge computing, according to an example. FIG. 2 illustrates a conventional network processor 200 used to perform operations on packets for network applications, such as IPSec or DTLS. The network processor 200 includes an ALU 202 with a special-purpose instruction set. The ALU 202 prepares modification commands at run time based on parameters obtained from the input packets 206 and specific protocol settings 204. The ALU 202 provides the commands to the modifier circuit 208 to perform (implement) the modification on the packets. A typical packet goes through multiple stages of such processing with each stage performing different functions on the packets before reaching the end of the processing pipeline.

To achieve high throughput in this conventional architecture, multiple packets are processed in parallel substantially simultaneously, with each pipeline requiring its own dedicated processing engine. The use of network processors arranged in parallel to perform such parallel modification operations on the packets is shown in FIG. 3. Multiple ALUs 202A-202M operate on multiple input packets. The packets are processed serially by modifier circuits 208A1-AN, 208B1-BN, . . . , 208M1-MN. The use of multiple ALUs for multiple network processing elements (e.g., where each ALU 202 generates commands at run time) results in significant power consumption and silicon area in a typical system.

Figure 4:
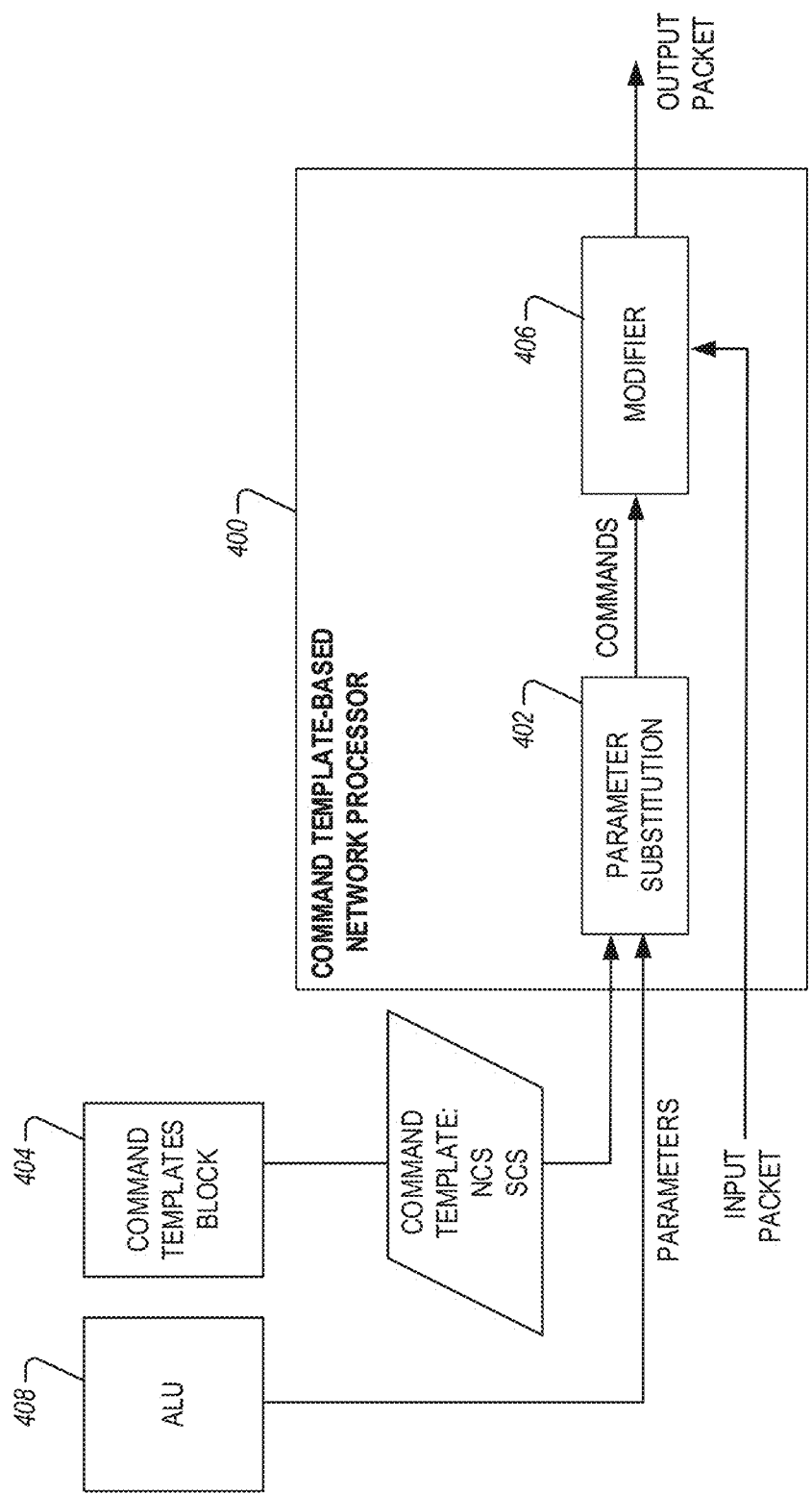
FIGS. 4 and 5 illustrate template-based network packet processing, according to an example.

To overcome the drawback of each ALU generating commands at run time in the network processing system described above, a command-template based (CTB) network processor 400 is provided in FIG. 4. The sophisticated ALU in FIG. 3, which generates commands for the modifier circuit 208 at run time, is replaced by a simple "parameter substitution" circuitry 402 in FIG. 4 where commands for the parameter substitution circuitry 402 are obtained from a command templates block 404 (e.g., a template data store) with some parameter modification at run time.

Specifically, the network processor 400 of FIG. 4 implements a command-template based network processing method that substitutes pre-prepared commands with run-time parameters to efficiently process packets in networking applications. This results in the elimination of multiple packet processing engines (e.g., the multiple instances of modifier circuitry 208) and their replacement by a single engine (e.g., CTB network processor 400). Such a solution is highly optimized from a latency performance, power, and circuitry area perspective.

The command templates block 404, loaded during initialization, stores sets of command templates with pre-prepared (e.g., previously prepared or pre-determined) commands. Each command template includes two sets of commands: the network command set (NCS) and the substitute command set (SCS). The network command set includes commands to be used by the modifier 406 in the CTB network processor 400 to directly modify each packet. The substitute command set includes commands used by the parameters substitution block 402 to modify the network command set before being sent to the modifier 406 to modify a packet (e.g., each packet in a stream of packets).

The command template-based network processor 400, based on the protocol, will select one template from the command templates block 404, and the parameter substitution block 402 will use the SCS from the selected template to replace some fields in the NCS using input parameters. The input parameters are received from an ALU 408. The NCS is then sent to the modifier 406 to make modification to the packets (and produce the output packets).

The parameters provided to the network processor 400 by the ALU 408 are in fixed (e.g., predefined) format, and the templates provided to the network processor 400 are also in a fixed (e.g., predefined) format. In this way, the parameter substitution block 402 simply operates to copy parameters into the NCS based on the SCS. The command templates block 404 is shared by each network processor 400 (and thus, multiple network processors can operate in parallel in some settings). The parameters are prepared by the ALU 408 at run time for each packet, and become part of the packet metadata passed from stage to stage.

Figure 5:
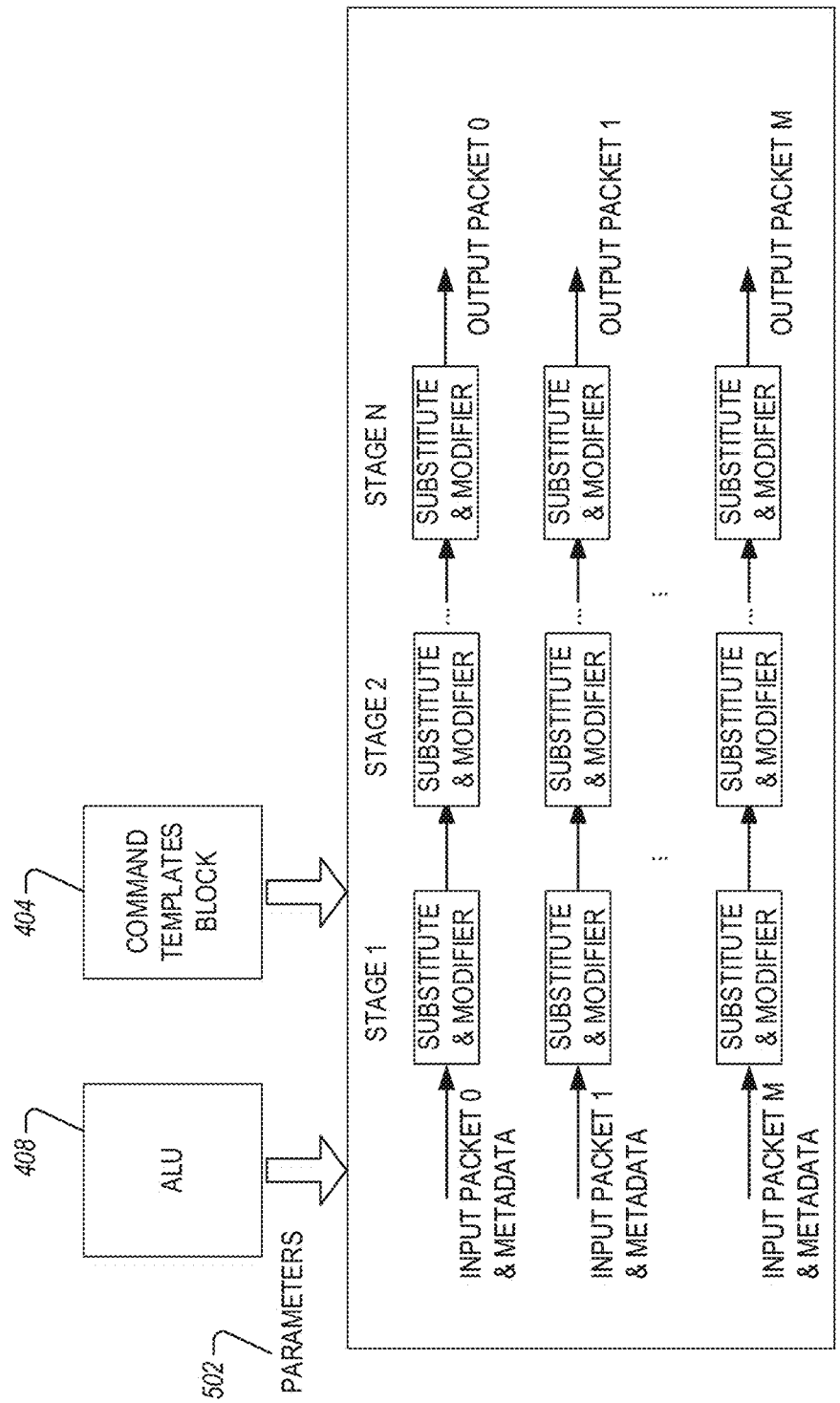

FIG. 5 depicts an example system with multiple command template based processors, arranged to process input packets in parallel. At each stage, a template (e.g., provided by the command templates block 404) is used to provide the substitute command set, which is then used to modify the network command set based on the ALU parameters 502. ALU parameters 502 are fed into the pipeline and are available to each stage. In an example, a single template may be passed along and used at each stage. In another example, a different template may be provided by the command templates block 404 for each stage (e.g., the template may be a template designed for use at a particular stage). In either example, a single ALU can be used to provide the parameters for application by the templates.

Figure 6:
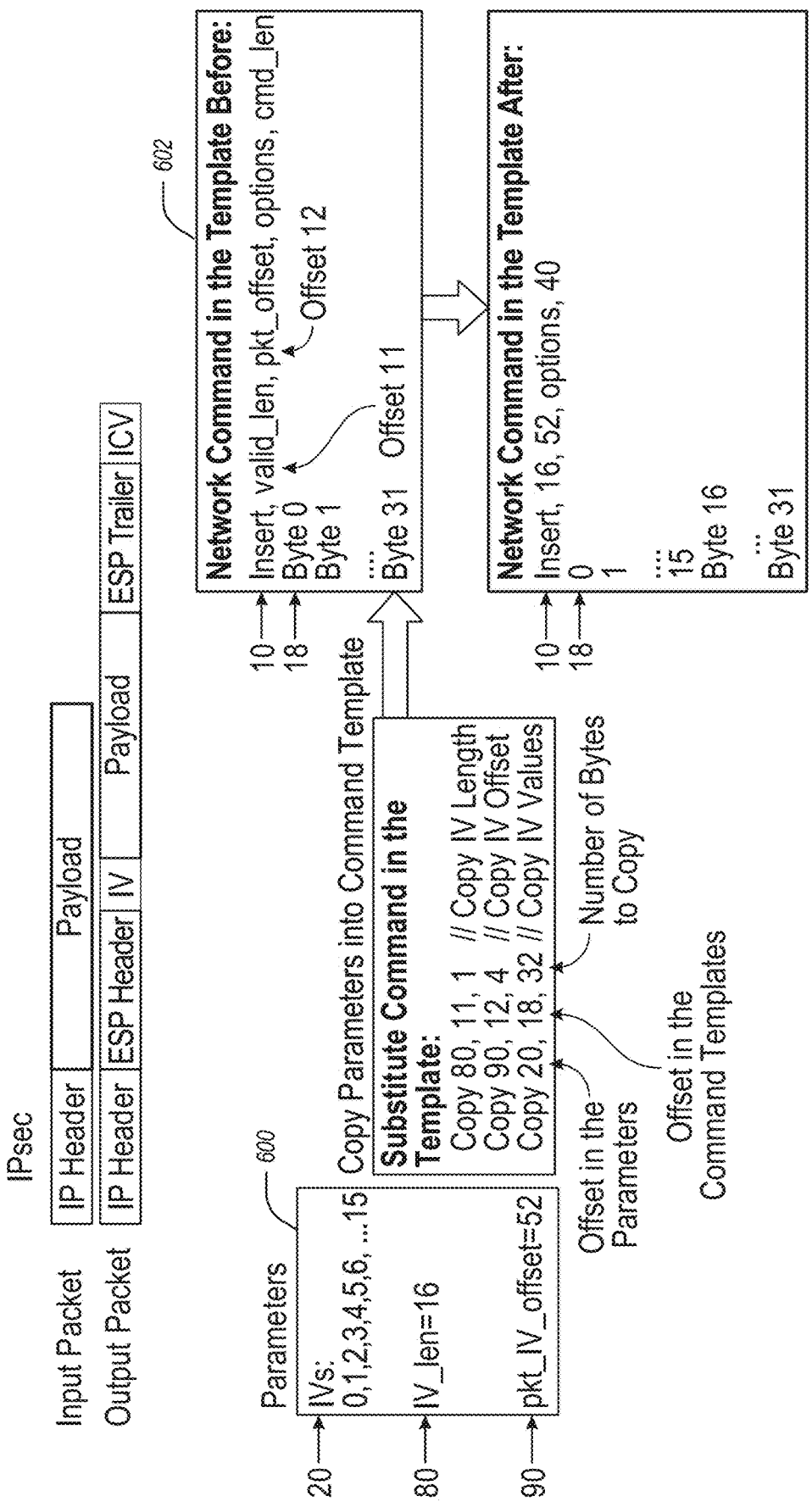
FIG. 6 illustrates use of a command template with network processing, according to an example.

FIG. 6 provides a further network processing example, to illustrate the use of a command template based network processing mechanism. In this example, a field called "IV" that has 16 bytes needs to be inserted into the packet at location offset 52. A set of parameters 600 are provided by an ALU. The parameters 600 include the 16-byte IV data, the IV length measured in bytes (i.e., 16), and the IV location in the packet of offset 52. These values for the IV field are in the parameters 600 located at address 20, 80, and 90, respectively.

A template includes a network command 602. The network command 602 has an insert command to insert the IV located at offset 10 in the network command set 602. The insert command has four fields, each 1 byte long except the pkt offset field which is 4 bytes long. The insert command is followed by 32 bytes, which are used to store up to 32 bytes of data. The cmd_len is the length of the current command, which is 40 bytes for this case. The valid_len is the actual IV length. The valid_len is updated by the substitution command with IV_len=16. In the insert command, the pkt_otfset is the location in the packet where the IV values will be inserted, and in this case, it will be updated by the substitute command with a value of 52 (pkt_IV_offset) value in the parameters 600).

The substitution command format is simple: copy, source offset, destination offset, length. Thus, as illustrated in FIG. 6, the first COPY command is "COPY 80, 11, 1", which instructs the parameter substitution circuitry to copy the parameter at offset 80 from the parameters to the offset 11 in the network command portion of the template with a field size (or length) of 1 byte. Similarly, the COPY command "COPY 90, 12, 4" will copy the contents of the parameter at offset 90 to offset 12 in the network command, copying 4 bytes of data to that location in the network command.

The resulting network command will be used by the modifier, which, in this case, will insert 16 bytes of data at packet offset 52, and then advance to the next command which is 40 bytes away.

Accordingly, this command template-based network processing mechanism effectively substitutes pre-prepared commands with run-time parameters to efficiently process packets in high-performance networking applications. This eliminates the need for multiple network processing engines while requiring only one common engine. This may require far fewer ALUs and reduce the amount of time for processing.

Similar to the approaches discussed above for IPSec, this packet processing technique may apply to other various routing protocols including those used in satellite communication networks. In some examples, LEO satellite network routing can be performed on the ground "off-line," and used for setting up the paths among satellite and ground nodes. However, constellation nodes are dynamic time variable due to orbital shifts, off-line nodes, and or exclusion zone servicing. Depending on how a provider approaches these issues, different protocols or satellite-to-satellite communication technologies (e.g., radio or laser) may be used, for example, to support use of inter satellite links (ISLs) or to service premium subscribers (like URLCC—ultra reliable low latency connections). Consequently, if processing is shifted into orbit, then latency, power, and simplistic processing becomes an important consideration that is addressed with the command template-based network processor discussed above.

Further, with use of minimal memory data changes (to avoid corruption due to space solar radiation) then the value of the command template processing becomes apparent. This is especially beneficial for those protocols like asynchronous transfer mode (ATM) where the virtual nodes are set and can be dynamically adjusted for shortest path. Thus, with use of the present packet processing techniques, dynamic network processing changes can be addressed in orbit at the satellite vehicle—closer to the actual path re-routing.

Additionally, the reference architecture for the packet processing template discussed herein may also be extended as part of a "regenerative satellite enabled NR-RAN with distributed gNB" as part of an improved 5G network. Here, the gNB-DU (distributed unit) may be hosted at a satellite, and therefore some of the NR protocols are processed by the on-board at the satellite, using an in-orbit DU. In contrast, existing deployments for a vRAN-DU are located on the ground. Consider an example of having to re-route when there is a sudden change of traffic load that causes congestion and there is no time to wait for ground based (off-line) routing to happen, so the satellite needs to step in. In this situation, low latency, limited processing capability, and immediate response can be provided by the present packet template processing techniques at the satellite communications hardware.

Figure 7:
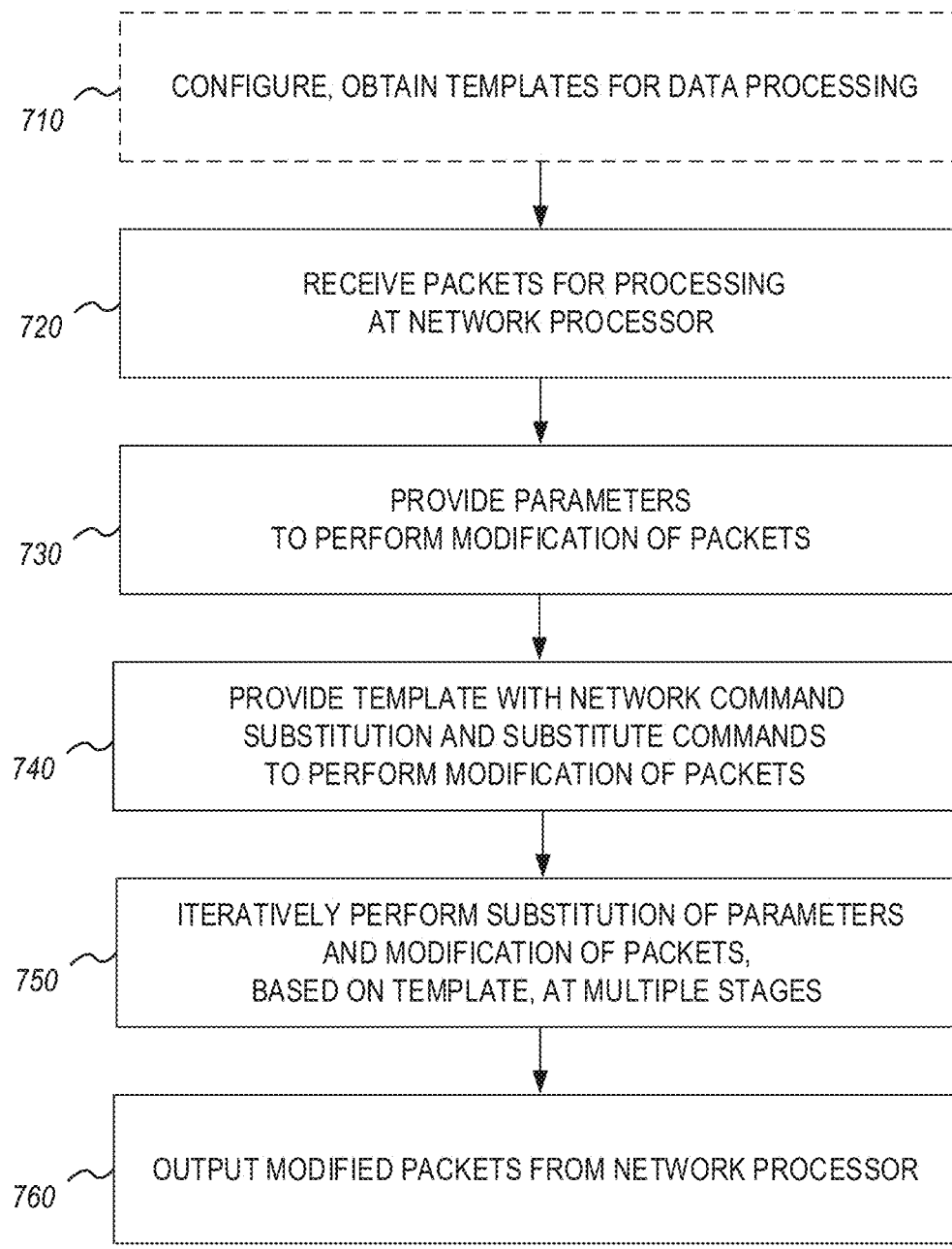
FIG. 7 illustrates a flowchart of an example packet processing method using command templates, according to an example.

FIG. 7 provides a flowchart 700 of a template-based, packet processing technique. This flowchart 700 begins, at operation 710, with an initial function (optional in subsequent iterations of the method) of configuring and obtaining the templates for data processing, as discussed above with reference to command templates block 404. A single template may be applied at multiple stages, or multiple templates may be applied at respective stages, as noted above. Various configurations of a template-implementing hardware (e.g., "templatizer" and an ALU, FPGA, or other circuitry) may also be enabled in these operations.

The flowchart 700 continues, at operation 720, with the receipt of one or more packets from a packet stream, which are processed with the network processor (e.g., network processor 400) as follows. As noted above, this packet stream and the packet modification being performed may relate to any number of terrestrial and non-terrestrial routing, security, or data transfer protocols. In various examples, the stream of packets or an instance of such a stream of packets is obtained for processing by receipt (receiving) of the packet stream at the network processor or other hardware. Such obtaining may involve various aspects of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive the stream of packets (or the following parameters and templates or template values).

At operation 730, the parameters for modification of the one or more packets (e.g., to be modified by the ALU 408) are generated and provided. A template or an instance of a template is obtained (e.g., retrieved, accessed, provided from the command templates block 404, or another data store) and is provided at operation 740, and the template is used for initial parameter substitution (e.g., with operations by the parameter substitution block 402). The initial parameter substitution at operation 740 provides substitution commands that can be used to modify the particular type of packet being processed.

At operation 750, the substitution commands are applied, to modify the one or more processed packets, based on the substituted parameters provided into the template. This operation may be performed by a packet modifier (e.g., modifier 406) as discussed above. Such substitution commands may be iteratively performed to modify packets at multiple stages, such as is shown in FIG. 5, but in some examples operations may be used in parallel. Finally, at operation 760, modified packets may be output from the network processor and communicated or further used in the network scenario.

It will be understood that the operations discussed above may be applicable to a variety of form factors and systems. For instance, one such implementation may be a network packet processing device implemented by a network interface card, switch, network termination point, base station or access point, and the like. Another implementation may be network packet processing circuitry such as a system-on-chip (SoC), FPGA, infrastructure processing unit (IPU), data processing unit (DPU), smart network interface card controller, other specialized circuitry which is configured to perform network processing according to the techniques discussed herein. Another implementation may involve substitution, replacement, or augmentation of the described ALU with central processing unit (CPU) circuitry, an application specific integrated circuit (ASIC) or field-programmable gate array (FPGA) hardware, or other specialized logic units. Another implementation may be a computer-readable medium that provides instructions, implemented by circuitry such as the aforementioned specialized circuitry, for implementing operations of network processing according to the techniques discussed herein. Another implementation may be a method implemented by processing circuitry or the aforementioned specialized circuitry, for implementing operations of network processing according to the techniques discussed herein.

Implementation in Edge Computing Scenarios

It will be understood that the present terrestrial and non-terrestrial networking arrangements may be integrated with many aspects of edge computing strategies and deployments. Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

In the context of satellite communication networks, edge computing operations may occur, as discussed above, by: moving workloads onto compute equipment at satellite vehicles; using satellite connections to offer backup or (redundant) links and connections to lower-latency services; coordinating workload processing operations at terrestrial access points or base stations; providing data and content via satellite networks: and the like. Thus, many of the same edge computing scenarios that are described below for mobile networks and mobile client devices are equally applicable when using a non-terrestrial network.

Figure 8:
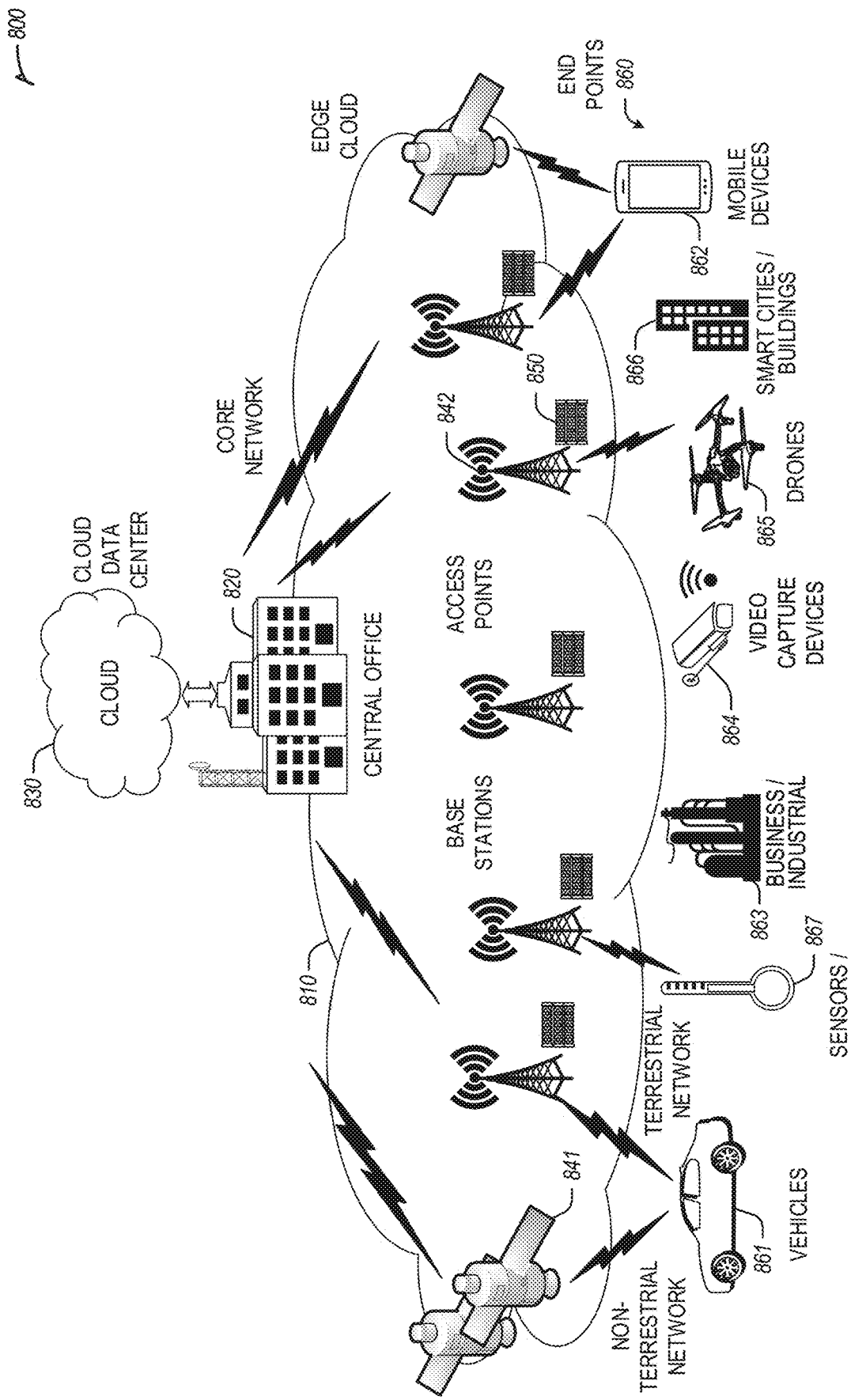
FIG. 8 illustrates an overview of an edge cloud configuration for edge computing, according to an example.

FIG. 8 is a block diagram 800 showing an overview of a configuration for edge computing, which includes a layer of processing referenced in many of the current examples as an "edge cloud". This network topology, which may include a number of conventional networking layers (including those not shown herein), may be extended through use of the satellite and non-terrestrial network communication arrangements discussed herein.

As shown, the edge cloud 810 is co-located at an edge location, such as a satellite vehicle 841, a base station 842, a local processing hub 850, or a central office 820, and thus may include multiple entities, devices, and equipment instances. The edge cloud 810 is located much closer to the endpoint (consumer and producer) data sources 860 (e.g., autonomous vehicles 861, user equipment 862, business and industrial equipment 863, video capture devices 864, drones 865, smart cities and building devices 866, sensors and IoT devices 867, etc.) than the cloud data center 830. Compute, memory, and storage resources which are offered at the edges in the edge cloud 810 are critical to providing ultra-low or improved latency response times for services and functions used by the endpoint data sources 860 as well as reduce network backhaul traffic from the edge cloud 810 toward cloud data center 830 thus improving energy consumption and overall network usages among other benefits.

Compute, memory, and storage are scarce resources, and generally decrease depending on the edge location (e.g., fewer processing resources being available at consumer endpoint devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in network access time. In the scenario of non-terrestrial network, distance and latency may be far to and from the satellite, but data processing may be better accomplished at edge computing hardware in the satellite vehicle rather requiring additional data connections and network backhaul to and from the cloud.

In an example, an edge cloud architecture extends beyond typical deployment limitations to address restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Likewise, within edge computing deployments, there may be scenarios in services which the compute resource will be "moved" to the data, as well as scenarios in which the data will be "moved" to the compute resource. Or as an example, base station (or satellite vehicle) compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In contrast to the network architecture of FIG. 8, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges. The extension of satellite capabilities within an edge computing network provides even more possible permutations of managing compute, data, bandwidth, resources, service levels, and the like.

Depending on the real-time requirements in a communications context, a hierarchical structure of data processing and storage nodes may be defined in an edge computing deployment involving satellite connectivity. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 9:
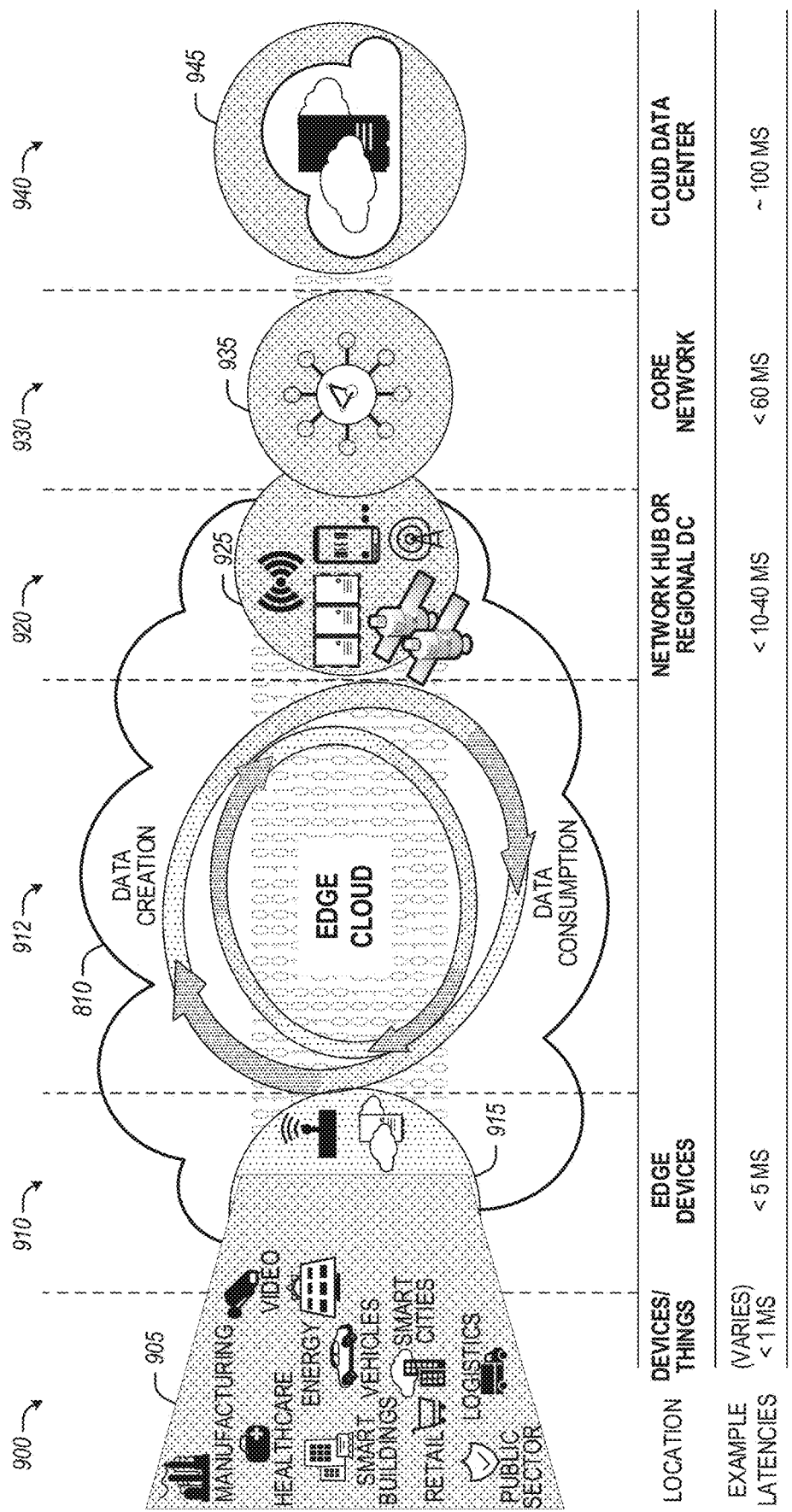
FIG. 9 illustrates an overview of layers of distributed compute deployed among an edge computing system, according to an example.

FIG. 9 illustrates operational layers among endpoints, an edge cloud, and cloud computing environments. Specifically, FIG. 9 depicts examples of computational use cases 905, utilizing the edge cloud 810 among multiple illustrative layers of network computing. The layers begin at an endpoint (devices and things) layer 900, which accesses the edge cloud 810 to conduct data creation, analysis, and data consumption activities. The edge cloud 810 may span multiple network layers, such as an edge devices layer 910 having gateways, on-premise servers, or network equipment (nodes 915) located in physically proximate edge systems; a network access layer 920, encompassing base stations, radio processing units, network hubs, regional data centers (DC), or local network equipment (equipment 925); and any equipment, devices, or nodes located therebetween (in layer 912, not illustrated in detail). The network communications within the edge cloud 810 and among the various layers may occur via any number of wired or wireless mediums, including via connectivity architectures and technologies not depicted.

Examples of latency with terrestrial networks, resulting from network communication distance and processing time constraints, may range from less than a millisecond (ms) when among the endpoint layer 900, under 5 ms at the edge devices layer 910, to even between 10 to 40 ms when communicating with nodes at the network access layer 920. (Variation to these latencies is expected with use of non-terrestrial networks). Beyond the edge cloud 810 are core network 930 and cloud data center 940 layers, each with increasing latency (e.g., between 50-60 ms at the core network layer 930, to 100 or more ms at the cloud data center layer). As a result, operations at a core network data center 935 or a cloud data center 945, with latencies of at least 50 to 100 ms or more, will not be able to accomplish many time-critical functions of the use cases 905. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 935 or a cloud data center 945, a central office or content data network may be considered as being located within a "near edge" layer ("near" to the cloud, having high latency values when communicating with the devices and endpoints of the use cases 905), whereas an access point, base station, on-premise server, or network gateway may be considered as located within a "far edge" layer ("far" from the cloud, having low latency values when communicating with the devices and endpoints of the use cases 905). It will be understood that other categorizations of a particular network layer as constituting a "close", "local", "near", "middle", or "far" edge may be based on latency, distance, number of network hops, or other measurable characteristics, as measured from a source in any of the network layers 900-940.

The various use cases 905 may access resources under usage pressure from incoming streams, due to multiple services utilizing the edge cloud. To achieve results with low latency, the services executed within the edge cloud 810 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement operations to remediate.

Thus, with these variations and service features in mind, edge computing within the edge cloud 810 may provide the ability to serve and respond to multiple applications of the use cases 905 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), etc.), which cannot leverage conventional cloud computing due to latency or other limitations. This is especially relevant for applications which require connection via satellite, and the additional latency that trips via satellite would require to the cloud.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 810 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 810 (network layers 900-940), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, circuitry, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 810.

As such, the edge cloud 810 is formed from network components and functional features operated by and within edge gateway nodes, edge aggregation nodes, or other edge compute nodes among network layers 910-930. The edge cloud 810 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 810 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 810 may be servers, multi-tenant servers, appliance computing devices, and/or any other type of computing devices. For example, a node of the edge cloud 810 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 12B. The edge cloud 810 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 10:
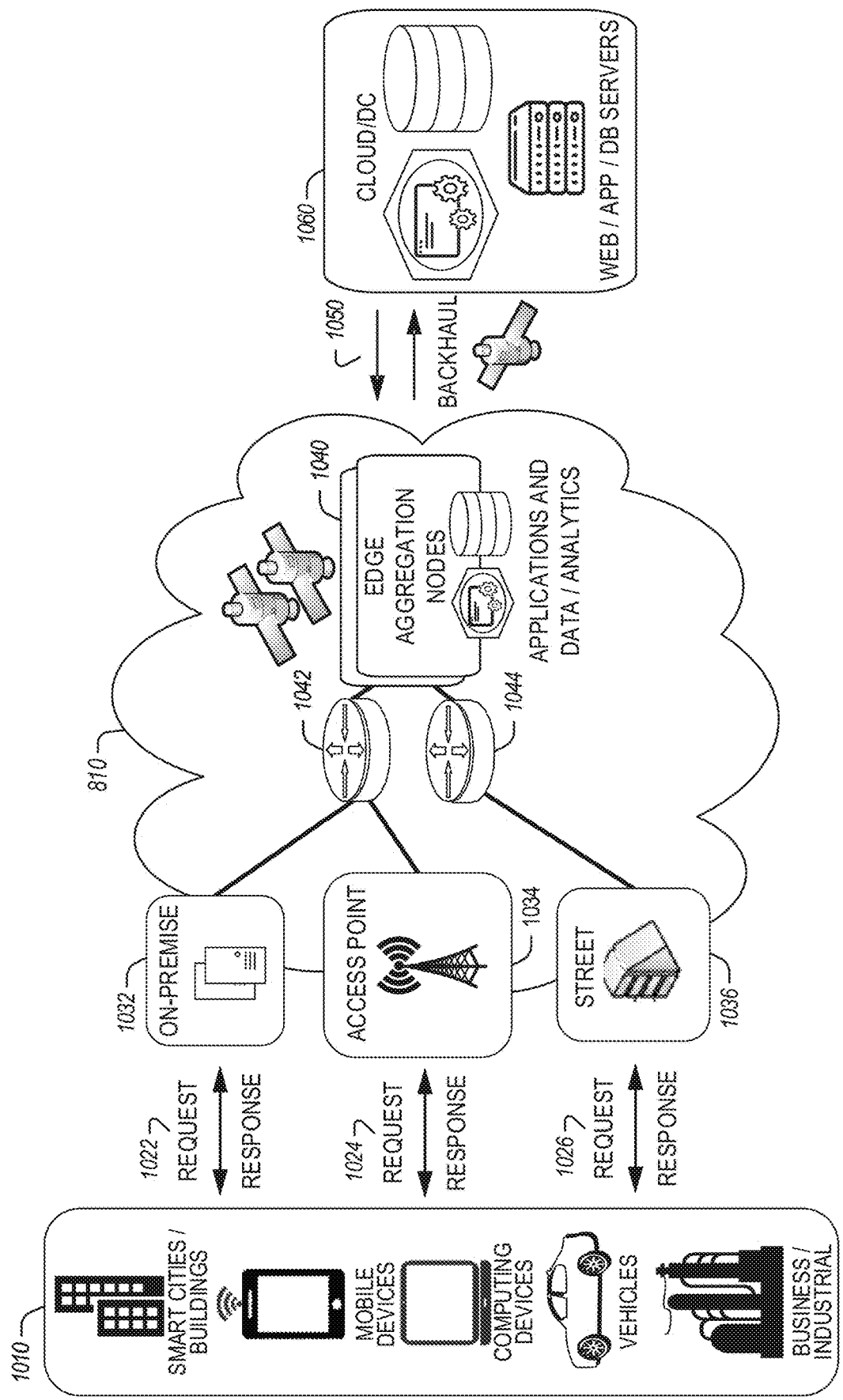
FIG. 10 illustrates operational layers among endpoints, an edge cloud, and cloud computing environments, according to an example.

In FIG. 10, various client endpoints 1010 (in the form of mobile devices, computers, autonomous vehicles, business computing equipment, industrial processing equipment) exchange requests and responses that are specific to the type of endpoint network aggregation. For instance, client endpoints 1010 may obtain network access via a wired broadband network, by exchanging requests and responses 1022 through an on-premise network system 1032. Some client endpoints 1010, such as mobile computing devices, may obtain network access via a wireless broadband network, by exchanging requests and responses 1024 through an access point (e.g., cellular network tower) 1034. Some client endpoints 1010, such as autonomous vehicles may obtain network access for requests and responses 1026 via a wireless vehicular network through a street-located network system 1036. However, regardless of the type of network access, the TSP may deploy aggregation points 1042, 1044 within the edge cloud 810 to aggregate traffic and requests. Thus, within the edge cloud 810, the TSP may deploy various compute and storage resources, such as at edge aggregation nodes 1040 (including those located at satellite vehicles), to provide requested content. The edge aggregation nodes 1040 and other systems of the edge cloud 810 are connected to a cloud or data center 1060, which uses a backhaul network 1050 (such as a satellite backhaul) to fulfill higher-latency requests from a cloud/data center for websites, applications, database servers, etc. Additional or consolidated instances of the edge aggregation nodes 1040 and the aggregation points 1042, 1044, including those deployed on a single server framework, may also be present within the edge cloud 810 or other areas of the TSP infrastructure.

At a more generic level, an edge computing system may be described to encompass any number of deployments operating in the edge cloud 810, which provide coordination from client and distributed computing devices. FIG. 9 provides a further abstracted overview of layers of distributed compute deployed among an edge computing environment for purposes of illustration.

Figure 11:
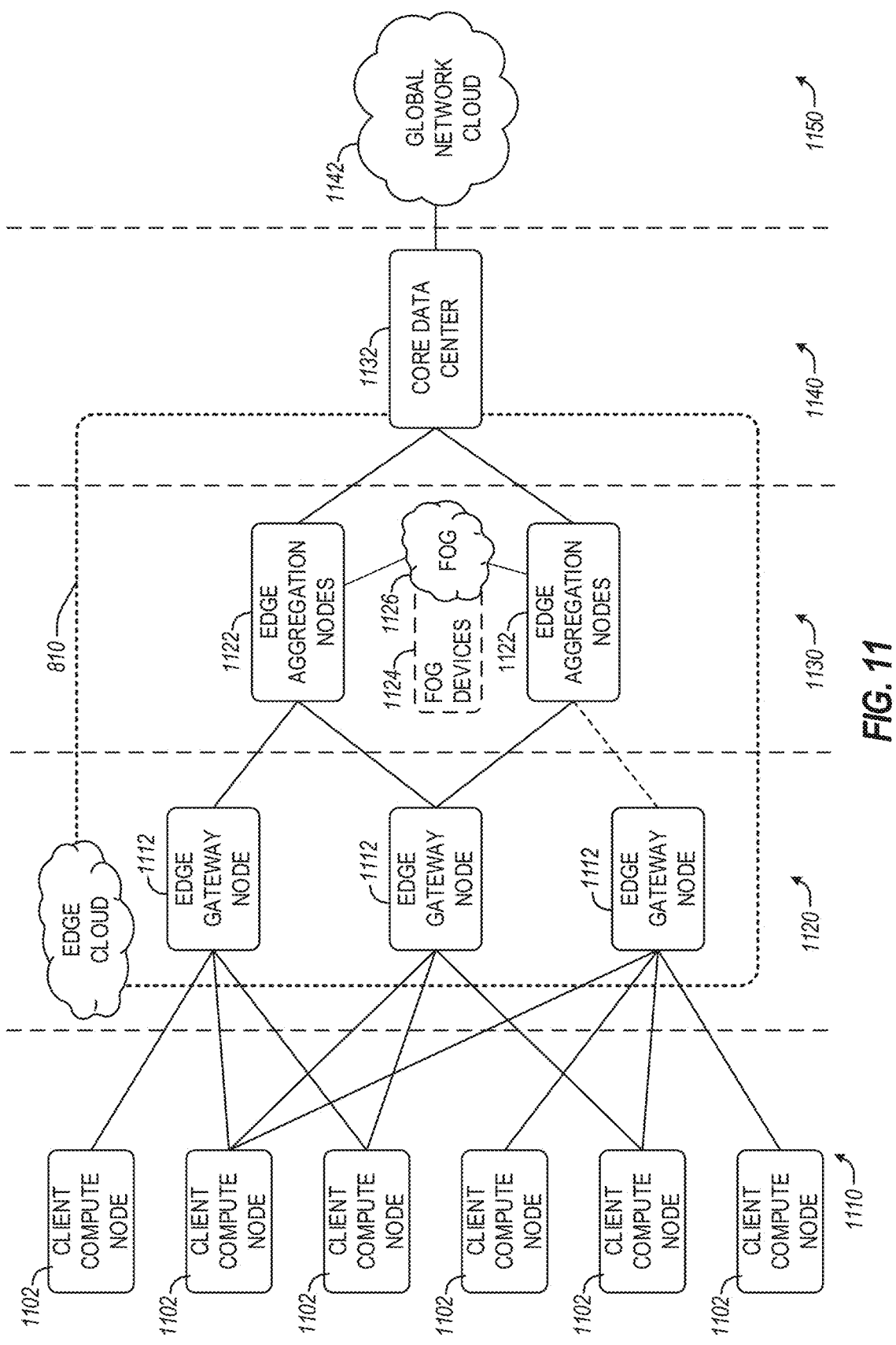
FIG. 11 illustrates an example approach for networking and services in an edge computing system, according to an example.

FIG. 11 generically depicts an edge computing system for providing edge services and applications to multi-stakeholder entities, as distributed among one or more client compute nodes 1102, one or more edge gateway nodes 1112, one or more edge aggregation nodes 1122, one or more core data centers 1132, and a global network cloud 1142, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 910, 920, 930, 940, 950. For example, the client compute nodes 1102 are each located at an endpoint layer 910, while each of the edge gateway nodes 1112 are located at an edge devices layer 920 (local level) of the edge computing system. Additionally, each of the edge aggregation nodes 1122 (and/or fog devices 1124, if arranged or operated with or among a fog networking configuration 1126) are located at a network access layer 930 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 1132 is located at a core network layer 940 (e.g., a regional or geographically-central level), while the global network cloud 1142 is located at a cloud data center layer 950 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 1132 may be located within, at, or near the edge cloud 810.

Although an illustrative number of client compute nodes 1102, edge gateway nodes 1112, edge aggregation nodes 1122, core data centers 1132, global network clouds 1142 are shown in FIG. 11, it should be appreciated that the edge computing system may include more or fewer devices or systems at each layer. Additionally, as shown in FIG. 11, the number of components of each layer 910, 920, 930, 940, 950 generally increases at each lower level (i.e., when moving closer to endpoints). As such, one edge gateway node 1112 may service multiple client compute nodes 1102, and one edge aggregation node 1122 may service multiple edge gateway nodes 1112.

Consistent with the examples provided herein, each client compute node 1102 may be embodied as any type of end point component, device, appliance, or "thing" capable of communicating as a producer or consumer of data. Further, the label "node" or "device" as used in the edge computing system 1100 does not necessarily mean that such node or device operates in a client or agent/minion/follower role; rather, any of the nodes or devices in the edge computing system 1100 refer to individual entities, nodes, or subsystems which include discrete or connected hardware or software configurations to facilitate or use the edge cloud 810.

As such, the edge cloud 810 is formed from network components and functional features operated by and within the edge gateway nodes 1112 and the edge aggregation nodes 1122 of layers 920, 930, respectively. The edge cloud 810 may be embodied as any type of network that provides edge computing and/or storage resources which are proximately located to radio access network (RAN) capable endpoint devices (e.g., mobile computing devices, IoT devices, smart devices, etc.), which are shown in FIG. 9 as the client compute nodes 1102. In other words, the edge cloud 810 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 810 may form a portion of or otherwise provide an ingress point into or across a fog networking configuration 1126 (e.g., a network of fog devices 1124, not shown in detail), which may be embodied as a system-level horizontal and distributed architecture that distributes resources and services to perform a specific function. For instance, a coordinated and distributed network of fog devices 1124 may perform computing, storage, control, or networking aspects in the context of an IoT system arrangement. Other networked, aggregated, and distributed functions may exist in the edge cloud 810 between the cloud data center layer 950 and the client endpoints (e.g., client compute nodes 1102). Some of these are discussed in the following sections in the context of network functions or service virtualization, including the use of virtual edges and virtual services which are orchestrated for multiple stakeholders.

The edge gateway nodes 1112 and the edge aggregation nodes 1122 cooperate to provide various edge services and security to the client compute nodes 1102. Furthermore, because each client compute node 1102 may be stationary or mobile, each edge gateway node 1112 may cooperate with other edge gateway devices to propagate presently provided edge services and security as the corresponding client compute node 1102 moves about a region. To do so, each of the edge gateway nodes 1112 and/or edge aggregation nodes 1122 may support multiple tenancy and multiple stakeholder configurations, in which services from (or hosted for) multiple service providers and multiple consumers may be supported and coordinated across a single or multiple compute devices.

In further examples, any of the compute nodes or devices discussed with reference to the present Edge computing systems and environment may be fulfilled based on the components depicted in FIGS. 12A and 12B. Respective Edge compute nodes may be embodied as a type of device, appliance, computer, or other "thing" capable of communicating with other Edge, networking, or endpoint components. For example, an Edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 12A:
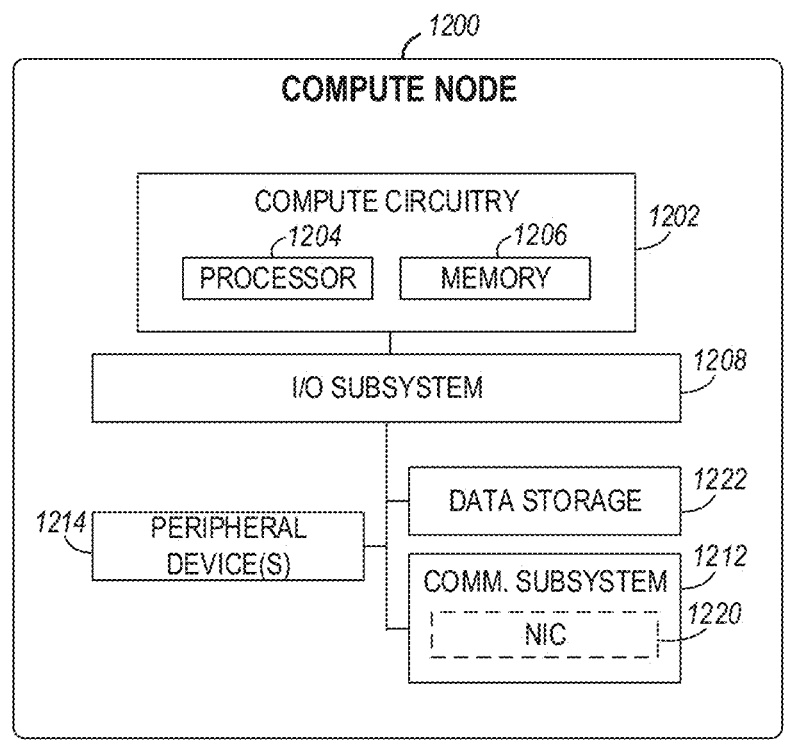
FIG. 12A illustrates an overview of example components deployed at a compute node system, according to an example.

In the simplified example depicted in FIG. 12A, an Edge compute node 1200 includes a compute engine (also referred to herein as "compute circuitry") 1202, an input/output (I/O) subsystem (also referred to herein as "I/O circuitry") 1208, data storage (also referred to herein as "data storage circuitry") 1210, a communication circuitry subsystem 1212, and, optionally, one or more peripheral devices (also referred to herein as "peripheral device circuitry") 1214. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1200 may be embodied as any type of engine, device, or collection of devices capable of performing various compute functions. In some examples, the compute node 1200 may be embodied as a single device such as an integrated circuit, an embedded system, a field-programmable gate array (FPGA), a system-on-a-chip (SOC), or other integrated system or device. In the illustrative example, the compute node 1200 includes or is embodied as a processor (also referred to herein as "processor circuitry") 1204 and a memory (also referred to herein as "memory circuitry") 1206. The processor 1204 may be embodied as any type of processor(s) capable of performing the functions described herein (e.g., executing an application). For example, the processor 1204 may be embodied as a multi-core processor(s), a microcontroller, a processing unit, a specialized or special purpose processing unit, or other processor or processing/controlling circuit.

In some examples, the processor 1204 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1204 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs or programmed FPGAs). Such an xPU may be designed to receive, retrieve and/or otherwise obtain programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1204 may work in coordination with each other to execute many types of operations and instructions within and on behalf of the compute node 1200.

The memory 1206 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device (e.g., memory circuitry) is any number of block addressable memory devices, such as those based on NAND or NOR technologies (for example, Single-Level Cell ("SLC"), Multi-Level Cell ("MLC"). Quad-Level Cell ("QLC"), Tri-Level Cell ("TLC"), or some other NAND). In some examples, the memory device(s) includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of the memory 1206 may be integrated into the processor 1204. The memory 1206 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0", set to logical "1", set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 1202 is communicatively coupled to other components of the compute node 1200 via the I/O subsystem 1208, which may be embodied as circuitry and/or components to facilitate input/output operations with the compute circuitry 1202 (e.g., with the processor 1204 and/or the main memory 1206) and other components of the compute circuitry 1202. For example, the I/O subsystem 1208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1208 may form a portion of a system-on-a-chip (SoC) and be incorporated, along with one or more of the processor 1204, the memory 1206, and other components of the compute circuitry 1202, into the compute circuitry 1202.

The one or more illustrative data storage devices/disks 1210 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 1210 may include a system partition that stores data and firmware code for the data storage device/disk 1210. Individual data storage devices/disks 1210 may also include one or more operating system partitions that store data files and executables for operating systems depending on, for example, the type of compute node 1200.

The communication circuitry 1212 may be embodied as any communication circuit, device, or collection thereof, capable of enabling communications over a network between the compute circuitry 1202 and another compute device (e.g., an Edge gateway of an implementing Edge computing system). The communication circuitry 1212 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1212 includes a network interface controller (NIC) 1220, which may also be referred to as a host fabric interface (HFI). The NIC 1220 may be embodied as one or more add-in-boards, daughter cards, network interface cards, controller chips, chipsets, or other devices that may be used by the compute node 1200 to connect with another compute device (e.g., an Edge gateway node). In some examples, the NIC 1220 may be embodied as part of a system-on-a-chip (SoC) that includes one or more processors, or included on a multichip package that also contains one or more processors. In some examples, the NIC 1220 may include a local processor (not shown) and/or a local memory (not shown) that are both local to the NIC 1220. In such examples, the local processor of the NIC 1220 may be capable of performing one or more of the functions of the compute circuitry 1202 described herein. Additionally, or alternatively, in such examples, the local memory of the NIC 1220 may be integrated into one or more components of the client compute node at the board level, socket level, chip level, and/or other levels.

Additionally, in some examples, a respective compute node 1200 may include one or more peripheral devices 1214. Such peripheral devices 1214 may include any type of peripheral device found in a compute device or server such as audio input devices, a display, other input/output devices, interface devices, and/or other peripheral devices, depending on the particular type of the compute node 1200. In further examples, the compute node 1200 may be embodied by a respective Edge compute node (whether a client, gateway, or aggregation node) in an Edge computing system or like forms of appliances, computers, subsystems, circuitry, or other components.

Figure 12B:
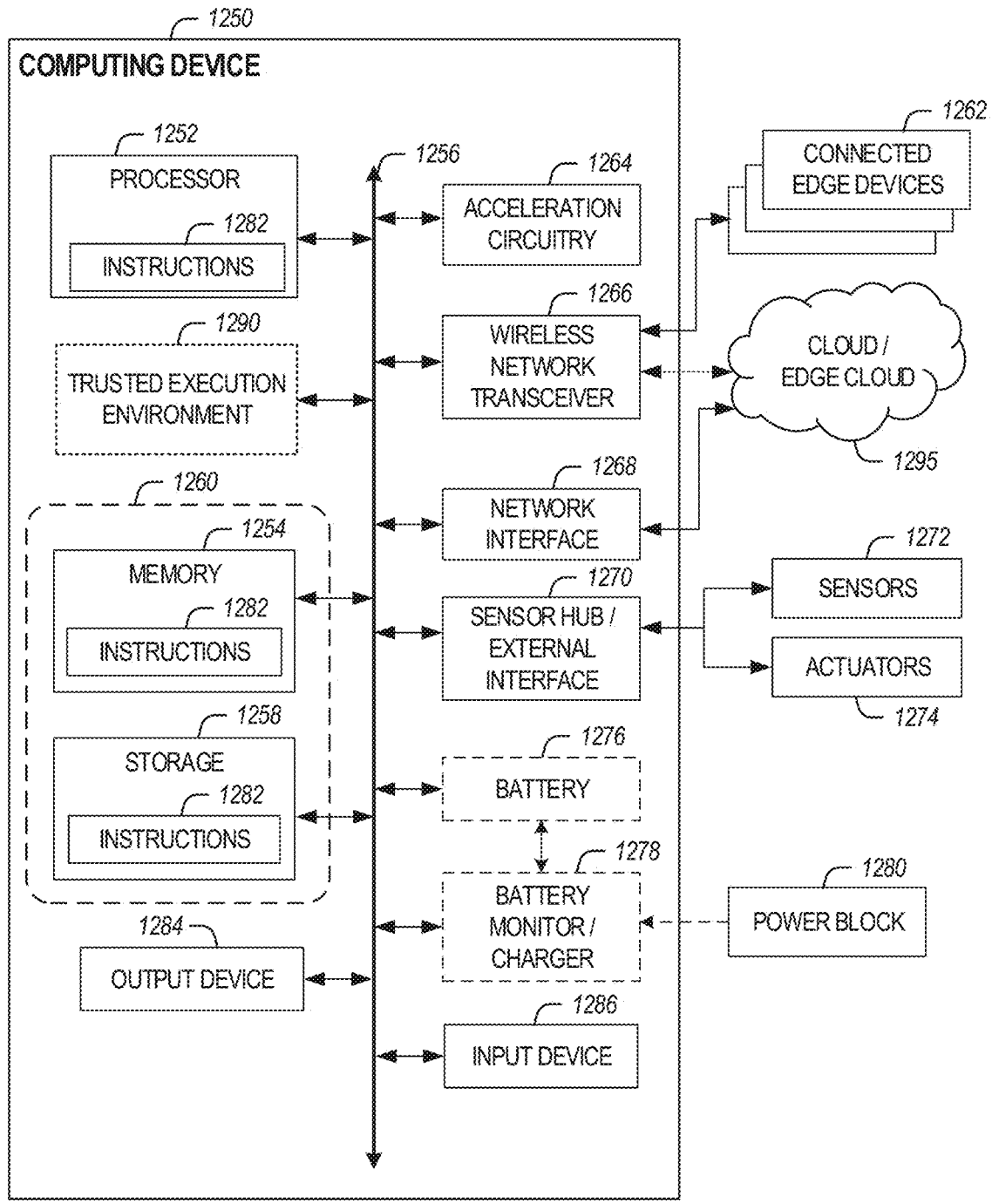
FIG. 12B illustrates a further overview of example components within a computing device, according to an example.

In a more detailed example, FIG. 12B illustrates a block diagram of an example of components that may be present in an Edge computing node 1250 for implementing the techniques (e.g., operations, processes, methods, and methodologies) described herein. This Edge computing node 1250 provides a closer view of the respective components of node 1200 when implemented as or as part of a computing device (e.g., as a mobile device, a base station, server, gateway, etc.). The Edge computing node 1250 may include any combination of the hardware or logical components referenced herein, and it may include or couple with any device usable with an Edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the Edge computing node 1250, or as components otherwise incorporated within a chassis of a larger system.

The Edge computing device 1250 may include processing circuitry in the form of a processor 1252, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1252 may be a part of a system on a chip (SoC) in which the processor 1252 and other components are formed into a single integrated circuit, or a single package, such as the Edison™ or Galileo™ SoC boards from Intel Corporation, Santa Clara, California As an example, the processor 1252 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1252 and accompanying circuitry may be provided in a single socket form factor, multiple socket form factor, or a variety of other formats, including in limited hardware configurations or configurations that include fewer than all elements shown in FIG. 12B.

The processor 1252 may communicate with a system memory 1254 over an interconnect 1256 (e.g., a bus). Any number of memory devices may be used to provide for a given amount of system memory. As examples, the memory 1254 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDiMMs or MiniDIMMs.

To provide for persistent storage of information such as data, applications, operating systems and so forth, a storage 1258 may also couple to the processor 1252 via the interconnect 1256. In an example, the storage 1258 may be implemented via a solid-state disk drive (SSDD). Other devices that may be used for the storage 1258 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1258 may be on-die memory or registers associated with the processor 1252. However, in some examples, the storage 1258 may be implemented using a micro hard disk drive (HDD). Further, any number of new technologies may be used for the storage 1258 in addition to, or instead of, the technologies described, such resistance change memories, phase change memories, holographic memories, or chemical memories, among others.

The components may communicate over the interconnect 1256. The interconnect 1256 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1256 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1256 may couple the processor 1252 to a transceiver 1266, for communications with the connected Edge devices 1262. The transceiver 1266 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected Edge devices 1262. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1266 (or multiple transceivers) may communicate using multiple standards or radios for communications at a different range. For example, the Edge computing node 1250 may communicate with close devices, e.g., within about 10 meters, using a local transceiver based on Bluetooth Low Energy (BLE), or another low power radio, to save power. More distant connected Edge devices 1262, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1266 (e.g., a radio transceiver) may be included to communicate with devices or services in a cloud (e.g., an Edge cloud 1295) via local or wide area network protocols. The wireless network transceiver 1266 may be a low-power wide-area (LPWA) transceiver that follows the IEEE 802.15.4, or IEEE 802.15.4g standards, among others. The Edge computing node 1250 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1266, as described herein. For example, the transceiver 1266 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1266 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1268 may be included to provide a wired communication to nodes of the Edge cloud 1295 or to other devices, such as the connected Edge devices 1262 (e.g., operating in a mesh). The wired communication may provide an Ethernet connection or may be based on other types of networks, such as Controller Area Network (CAN), Local Interconnect Network (LIN). DeviceNet, ControlNet, Data Highway+, PROFIBUS, or PROFINET, among many others. An additional NIC 1268 may be included to enable connecting to a second network, for example, a first NIC 1268 providing communications to the cloud over Ethernet, and a second NIC 1268 providing communications to other devices over another type of network.

Given the variety of types of applicable communications from the device to another component or network, applicable communications circuitry used by the device may include or be embodied by any one or more of components 1264, 1266, 1268, or 1270. Accordingly, in various examples, applicable means for communicating (e.g., receiving, transmitting, etc.) may be embodied by such communications circuitry.

The Edge computing node 1250 may include or be coupled to acceleration circuitry 1264, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific Edge computing tasks for service management and service operations discussed elsewhere in this document.

The interconnect 1256 may couple the processor 1252 to a sensor hub or external interface 1270 that is used to connect additional devices or subsystems. The devices may include sensors 1272, such as accelerometers, level sensors, flow sensors, optical light sensors, camera sensors, temperature sensors, global navigation system (e.g., GPS) sensors, pressure sensors, barometric pressure sensors, and the like. The hub or interface 1270 further may be used to connect the Edge computing node 1250 to actuators 1274, such as power switches, valve actuators, an audible sound generator, a visual warning device, and the like.

In some optional examples, various input/output (I/O) devices may be present within or connected to, the Edge computing node 1250. For example, a display or other output device 1284 may be included to show information, such as sensor readings or actuator position. An input device 1286, such as a touch screen or keypad may be included to accept input. An output device 1284 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the Edge computing node 1250. A display or console hardware, in the context of the present system, may be used to provide output and receive input of an Edge computing system; to manage components or services of an Edge computing system; identify a state of an Edge computing component or service; or to conduct any other number of management or administration functions or service use cases.

A battery 1276 may power the Edge computing node 1250, although, in examples in which the Edge computing node 1250 is mounted in a fixed location, it may have a power supply coupled to an electrical grid, or the battery may be used as a backup or for temporary capabilities. The battery 1276 may be a lithium ion battery, or a metal-air battery, such as a zinc-air battery, an aluminum-air battery, a lithium-air battery, and the like.

A battery monitor/charger 1278 may be included in the Edge computing node 1250 to track the state of charge (SoCh) of the battery 1276, if included. The battery monitor/charger 1278 may be used to monitor other parameters of the battery 1276 to provide failure predictions, such as the state of health (SoH) and the state of function (SoF) of the battery 1276. The battery monitor/charger 1278 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1278 may communicate the information on the battery 1276 to the processor 1252 over the interconnect 1256. The battery monitor/charger 1278 may also include an analog-to-digital (ADC) converter that enables the processor 1252 to directly monitor the voltage of the battery 1276 or the current flow from the battery 1276. The battery parameters may be used to determine actions that the Edge computing node 1250 may perform, such as transmission frequency, mesh network operation, sensing frequency, and the like.

A power block 1280, or other power supply coupled to a grid, may be coupled with the battery monitor/charger 1278 to charge the battery 1276. In some examples, the power block 1280 may be replaced with a wireless power receiver to obtain the power wirelessly, for example, through a loop antenna in the Edge computing node 1250. A wireless battery charging circuit, such as an LTC4020 chip from Linear Technologies of Milpitas, California, among others, may be included in the battery monitor/charger 1278. The specific charging circuits may be selected based on the size of the battery 1276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1258 may include instructions 1282 in the form of software, firmware, or hardware commands to implement the techniques described herein. Although such instructions 1282 are shown as code blocks included in the memory 1254 and the storage 1258, it may be understood that any of the code blocks may be replaced with hardwired circuits, for example, built into an application specific integrated circuit (ASIC).

In an example, the instructions 1282 provided via the memory 1254, the storage 1258, or the processor 1252 may be embodied as a non-transitory, machine-readable medium 1260 including code to direct the processor 1252 to perform electronic operations in the Edge computing node 1250. The processor 1252 may access the non-transitory, machine-readable medium 1260 over the interconnect 1256. For instance, the non-transitory, machine-readable medium 1260 may be embodied by devices described for the storage 1258 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 1260 may include instructions to direct the processor 1252 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 1282 on the processor 1252 (separately, or in combination with the instructions 1282 of the machine readable medium 1260) may configure execution or operation of a trusted execution environment (TEE) 1290. In an example, the TEE 1290 operates as a protected area accessible to the processor 1252 for secure execution of instructions and secure access to data. Various implementations of the TEE 1290, and an accompanying secure area in the processor 1252 or the memory 1254 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1250 through the TEE 1290 and the processor 1252.

While the illustrated examples of FIG. 12A and FIG. 12B include example components for a compute node and a computing device, respectively, examples disclosed herein are not limited thereto. As used herein, a "computer" may include some or all of the example components of FIGS. 12A and/or 12B in different types of computing environments. Example computing environments include Edge computing devices (e.g., Edge computers) in a distributed networking arrangement such that particular ones of participating Edge computing devices are heterogenous or homogeneous devices. As used herein, a "computer" may include a personal computer, a server, user equipment, an accelerator, etc., including any combinations thereof. In some examples, distributed networking and/or distributed computing includes any number of such Edge computing devices as illustrated in FIGS. 12A and/or 12B, each of which may include different sub-components, different memory capacities, I/O capabilities, etc. For example, because some implementations of distributed networking and/or distributed computing are associated with particular desired functionality, examples disclosed herein include different combinations of components illustrated in FIGS. 12A and/or 12B to satisfy functional objectives of distributed computing tasks. In some examples, the term "compute node" or "computer" only includes the example processor 1204, memory 1206 and I/O subsystem 1208 of FIG. 12A. In some examples, one or more objective functions of a distributed computing task(s) rely on one or more alternate devices/structure located in different parts of an Edge networking environment, such as devices to accommodate data storage (e.g., the example data storage 1210), input/output capabilities (e.g., the example peripheral device(s) 1214), and/or network communication capabilities (e.g., the example NIC 1220).

In some examples, computers operating in a distributed computing and/or distributed networking environment (e.g., an Edge network) are structured to accommodate particular objective functionality in a manner that reduces computational waste. For instance, because a computer includes a subset of the components disclosed in FIGS. 12A and 12B, such computers satisfy execution of distributed computing objective functions without including computing structure that would otherwise be unused and/or underutilized. As such, the term "computer" as used herein includes any combination of structure of FIGS. 12A and/or 12B that is capable of satisfying and/or otherwise executing objective functions of distributed computing tasks. In some examples, computers are structured in a manner commensurate to corresponding distributed computing objective functions in a manner that downscales or upscales in connection with dynamic demand. In some examples, different computers are invoked and/or otherwise instantiated in view of their ability to process one or more tasks of the distributed computing request(s), such that any computer capable of satisfying the tasks proceed with such computing activity.

In the illustrated examples of FIGS. 12A and 12B, computing devices include operating systems. As used herein, an "operating system" is software to control example computing devices, such as the example Edge compute node 1200 of FIG. 12A and/or the example Edge compute node 1250 of FIG. 12B. Example operating systems include, but are not limited to consumer-based operating systems (e.g., Microsoft® Windows® 10, Google® Android® OS, Apple® Mac® OS, etc.). Example operating systems also include, but are not limited to industry-focused operating systems, such as real-time operating systems, hypervisors, etc. An example operating system on a first Edge compute node may be the same or different than an example operating system on a second Edge compute node. In some examples, the operating system invokes alternate software to facilitate one or more functions and/or operations that are not native to the operating system, such as particular communication protocols and/or interpreters. In some examples, the operating system instantiates various functionalities that are not native to the operating system. In some examples, operating systems include varying degrees of complexity and/or capabilities. For instance, a first operating system corresponding to a first Edge compute node includes a real-time operating system having particular performance expectations of responsivity to dynamic input conditions, and a second operating system corresponding to a second Edge compute node includes graphical user interface capabilities to facilitate end-user I/O.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 12A and 12B are intended to depict a high-level view of components of a device, subsystem, or arrangement of an edge computing node. However, it will be understood that some of the components shown may be omitted, additional components may be present, and a different arrangement of the components shown may occur in other implementations.

FIG. 1310 illustrates an example software distribution platform 1305 to distribute software, such as the example computer readable instructions 1282 of FIG. 12B, to one or more devices, such as example processor platform(s) 1310 and/or other example connected edge devices or systems discussed herein. The example software distribution platform 1305 may be implemented by any computer server, data facility, cloud service, etc., capable of storing and transmitting software to other computing devices or circuitry (e.g., third parties, the example connected Edge devices 1262 of FIG. 12B, network equipment, the satellite or terrestrial routing equipment discussed above, etc.). Example connected edge devices may be customers, clients, managing devices (e.g., servers), third parties (e.g., customers of an entity owning and/or operating the software distribution platform 1305). Example connected edge devices may operate in commercial and/or home automation environments. In some examples, a third party is a developer, a seller, and/or a licensor of software such as the example computer readable instructions 1282 of FIG. 12B. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

Figure 13:
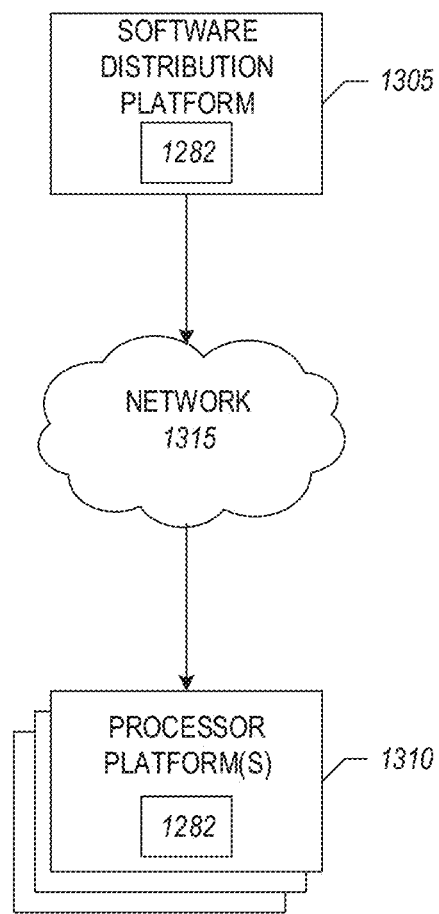
FIG. 13 illustrates a software distribution platform to distribute software instructions and derivatives, according to an example.

In the illustrated example of FIG. 13, the software distribution platform 1305 includes one or more servers and one or more storage devices that store the computer readable instructions 1282. The one or more servers of the example software distribution platform 1305 are in communication with a network 1315, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1282 from the software distribution platform 1305. For example, the software, which may correspond to example computer readable instructions, may be downloaded to the example processor platform(s), which is/are to execute the computer readable instructions 1282. In some examples, one or more servers of the software distribution platform 1305 are communicatively connected to one or more security domains and/or security devices through which requests and transmissions of the example computer readable instructions 1282 must pass. In some examples, one or more servers of the software distribution platform 1305 periodically offer, transmit, and/or force updates to the software (e.g., the example computer readable instructions 1282 of FIG. 12B) to ensure improvements, patches, updates, etc. are distributed and applied to the software at the end user devices.

In the illustrated example of FIG. 13, the computer readable instructions 1282 are stored on storage devices of the software distribution platform 1305 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 1282 stored in the software distribution platform 1305 are in a first format when transmitted to the example processor platform(s) 1310. In some examples, the first format is an executable binary in which particular types of the processor platform(s) 1310 can execute. However, in some examples, the first format is uncompiled code that requires one or more preparation tasks to transform the first format to a second format to enable execution on the example processor platform(s) 1310. For instance, the receiving processor platform(s) 1300 may need to compile the computer readable instructions 1282 in the first format to generate executable code in a second format that is capable of being executed on the processor platform(s) 1310. In still other examples, the first format is interpreted code that, upon reaching the processor platform(s) 1310, is interpreted by an interpreter to facilitate execution of instructions.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations that involve terrestrial network connectivity (where available) to increase network bandwidth/throughput and to support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Described implementations of the subject matter can include one or more features, alone or in combination as illustrated below by way of examples.

Example 1 is a device (e.g., a network packet processing device, implemented as a specialized circuit, programmed FPGA, logic unit or set of logic units, or a program, bitmap, or logic components for such units, etc.) comprising: a network interface to receive a stream of packets; an arithmetic logic unit (ALU); a command template store to provide a packet modification template, the packet modification template indicating at least one command to insert content within the packets and change the packets according to an output format of a network protocol; and circuitry comprising a plurality of processing components connected to the ALU and the command template store, the plurality of processing components arranged in parallel groups of serial pipelines, each of the serial pipelines including at least a first stage and a second stage, wherein processing components in each stage use parameters received from the ALU to modify the packets based on the packet modification template.

In Example 2, the subject matter of Example 1 optionally includes subject matter where the packet modification template provided from the command template store comprises a network command and a corresponding substitute command, wherein the substitute command uses the received parameters from the ALU to revise the network command, and wherein the revised network command is used to modify the packets.

In Example 3, the subject matter of Example 2 optionally includes subject matter where the network command is a generalized command structure.

In Example 4, the subject matter of any one or more of Examples 2-3 optionally include wherein the network command is related to a type of packet being processed from the stream of packets.

In Example 5, the subject matter of any one or more of Examples 1-4 optionally include subject matter where the ALU is the sole ALU in the network packet processing device.

In Example 6, the subject matter of any one or more of Examples 1-5 optionally include subject matter where a processing component in the first stage outputs a revised packet for each of the packets based on the commands in the packet modification template, and a processing component in the second stage receives the revised packet for each of the packets and further modifies the revised packet based on the commands in the packet modification template.

In Example 7, the subject matter of any one or more of Examples 1-6 optionally include subject matter where a processing component in the first stage outputs a revised packet for each of the packets being processed based on the commands in the packet modification template, and a processing component in the second stage receives the revised packet for each of the packets being processed and further modifies the revised packet based on a second packet modification template received from the template store.

In Example 8, the subject matter of any one or more of Examples 1-7 optionally include subject matter where each of the processing components in the first stage operate on a same type of packet provided according to a network communication protocol.

In Example 9, the subject matter of any one or more of Examples 1-8 optionally include subject matter where the network packet processing device is deployed in network processing hardware or on-board processing circuitry of a low-earth orbit satellite vehicle.

In Example 10, the subject matter of any one or more of Examples 1-9 optionally include subject matter where the stream of packets are of a first type of network communication protocol, and the plurality of processing components are used to convert the stream of packets to a second type of network communication protocol.

In Example 11, the subject matter of any one or more of Examples 1-10 optionally include subject matter where the command template store provides at least one packet modification template for pre-determined routing protocols used with satellite-based networking.

In Example 12, the subject matter of any one or more of Examples 1-11 optionally include subject matter where the circuitry is provided by an application-specific integrated circuit (ASIC) or Field-programmable gate array (FPGA).

In Example 13, the subject matter of any one or more of Examples 1-12 optionally include subject matter where the plurality of processing components comprise a plurality of network processors.

Example 14 is network packet processing circuitry, comprising at least one circuitry component (e.g., integrated circuit, IP block, etc.) configured to: obtain a stream of packets or an instance of a stream of packets; obtain a packet modification template or an instance of a packet modification template, the packet modification template indicating at least one command to insert content within the packets and change the packets according to an output format of a network protocol; receive parameters, the parameters to modify the packet modification template; and apply the packet modification template to modify the packets, wherein application of the packet modification template is performed using plurality of processing components arranged in parallel groups of serial pipelines, each of the serial pipelines applying a portion of the packet modification template within at least a first stage and a second stage in each of the serial pipelines.

In Example 15, the subject matter of Example 14 optionally includes subject matter where the packet modification template comprises a network command and a corresponding substitute command, wherein the substitute command uses the received parameters to revise the network command, and wherein the revised network command is used to modify the packets.

In Example 16, the subject matter of Example 15 optionally includes subject matter where the network command is a generalized command structure.

In Example 17, the subject matter of any one or more of Examples 15-16 optionally include subject matter where the network command is related to a type of packet being processed from the stream of packets.

In Example 18, the subject matter of any one or more of Examples 14-17 optionally include wherein the parameters are received from an ALU.

In Example 19, the subject matter of Example 18 optionally includes subject matter where the ALU is the sole ALU used with the network packet processing circuitry.

In Example 20, the subject matter of any one or more of Examples 14-19 optionally include subject matter where a processing component in the first stage outputs a revised packet for each of the packets being processed based on the commands in the packet modification template, and a processing component in the second stage receives the revised packet for each of the packets being processed and further modifies the revised packet based on a second packet modification template.

In Example 21, the subject matter of any one or more of Examples 14-20 optionally include subject matter where each of the processing components in the first stage operate on a same type of packet provided according to a network communication protocol.

In Example 22, the subject matter of any one or more of Examples 14-21 optionally include subject matter where the network packet processing circuitry is deployed in network processing hardware of a low-earth orbit satellite vehicle.

In Example 23, the subject matter of any one or more of Examples 14-22 optionally include subject matter where the stream of packets are of a first type of network communication protocol, and the plurality of processing components are used to convert the stream of packets to a second type of network communication protocol.

In Example 24, the subject matter of any one or more of Examples 14-23 optionally include subject matter where the packet modification template is configured for implementing at least one pre-determined routing protocol used with satellite-based networking.

Example 25 is at least one machine-readable storage medium comprising instructions stored thereupon, which when executed by network packet processing circuitry, cause the network packet processing circuitry (e.g., adapt or configure the circuitry, via the instructions, to perform operations) to: obtain a stream of packets or an instance of a stream of packets; obtain a packet modification template or an instance of a packet modification template, the packet modification template indicating at least one command to insert content within the packets and change the packets according to an output format of a network protocol; receive parameters, the parameters to modify the packet modification template; and apply the packet modification template to modify the packets, wherein application of the packet modification template is performed using plurality of processing components arranged in parallel groups of serial pipelines, each of the serial pipelines applying a portion of the packet modification template within at least a first stage and a second stage in each of the serial pipelines.

In Example 26, the subject matter of Example 25 optionally includes subject matter where the packet modification template comprises a network command and a corresponding substitute command, wherein the substitute command uses the received parameters to revise the network command, and wherein the revised network command is used to modify the packets.

In Example 27, the subject matter of Example 26 optionally includes subject matter where the network command is a generalized command structure.

In Example 28, the subject matter of any one or more of Examples 26-27 optionally include subject matter where the network command is related to a type of packet being processed from the stream of packets.

In Example 29, the subject matter of any one or more of Examples 25-28 optionally include subject matter where the parameters are received from an ALU.

In Example 30, the subject matter of Example 29 optionally includes subject matter where the ALU is the sole ALU used with the network packet processing circuitry.

In Example 31, the subject matter of any one or more of Examples 25-30 optionally include subject matter where a processing component in the first stage outputs a revised packet for each of the packets being processed based on the commands in the packet modification template, and a processing component in the second stage receives the revised packet for each of the packets being processed and further modifies the revised packet based on a second packet modification template.

In Example 32, the subject matter of any one or more of Examples 25-31 optionally include subject matter where each of the processing components in the first stage operate on a same type of packet provided according to a network communication protocol.

In Example 33, the subject matter of any one or more of Examples 25-32 optionally include subject matter where the network packet processing circuitry is deployed in network processing hardware of a low-earth orbit satellite vehicle.

In Example 34, the subject matter of any one or more of Examples 25-33 optionally include subject matter where the stream of packets are of a first type of network communication protocol, and the plurality of processing components are used to convert the stream of packets to a second type of network communication protocol.

In Example 35, the subject matter of any one or more of Examples 25-34 optionally include subject matter where the packet modification template is configured for implementing at least one pre-determined routing protocol used with satellite-based networking.

Example 36 is a method performed by network packet processing circuitry, comprising: obtaining a stream or an instance of a stream of packets; obtaining a packet modification template or an instance of a packet modification template, the packet modification template indicating at least one command to insert content within the packets and change the packets according to an output format of a network protocol; receiving parameters, the parameters to modify the packet modification template; and applying the packet modification template to modify the packets, wherein application of the packet modification template is performed using plurality of processing components arranged in parallel groups of serial pipelines, each of the serial pipelines applying a portion of the packet modification template within at least a first stage and a second stage in each of the serial pipelines.

In Example 37, the subject matter of Example 36 optionally includes subject matter where the packet modification template comprises a network command and a corresponding substitute command, wherein the substitute command uses the received parameters to revise the network command, and wherein the revised network command is used to modify the packets.

In Example 38, the subject matter of Example 37 optionally includes subject matter where the network command is a generalized command structure.

In Example 39, the subject matter of any one or more of Examples 37-38 optionally include subject matter where the network command is related to a type of packet being processed from the stream of packets.

In Example 40, the subject matter of any one or more of Examples 36-39 optionally include subject matter where the parameters are received from an ALU.

In Example 41, the subject matter of Example 40 optionally includes subject matter where the ALU is the sole ALU used with the network packet processing circuitry.

In Example 42, the subject matter of any one or more of Examples 36-41 optionally include subject matter where a processing component in the first stage outputs a revised packet for each of the packets being processed based on the commands in the packet modification template, and a processing component in the second stage receives the revised packet for each of the packets being processed and further modifies the revised packet based on a second packet modification template.

In Example 43, the subject matter of any one or more of Examples 36-42 optionally include subject matter where each of the processing components in the first stage operate on a same type of packet provided according to a network communication protocol.

In Example 44, the subject matter of any one or more of Examples 36-43 optionally include subject matter where the network packet processing circuitry is deployed in network processing hardware of a low-earth orbit satellite vehicle.

In Example 45, the subject matter of any one or more of Examples 36-44 optionally include subject matter where the stream of packets are of a first type of network communication protocol, and the plurality of processing components are used to convert the stream of packets to a second type of network communication protocol.

In Example 46, the subject matter of any one or more of Examples 36-45 optionally include subject matter where the packet modification template is configured for implementing at least one pre-determined routing protocol used with satellite-based networking.

Example 47 is a computing system apparatus, comprising: means for obtaining a stream or an instance of a stream of packets; means for obtaining a packet modification template or an instance of a packet modification template, the packet modification template indicating at least one command to insert content within the packets and change the packets according to an output format of a network protocol; means for determining parameters to modify the packet modification template; and means for applying the packet modification template to modify the packets, wherein application of the packet modification template is performed using plurality of processing components arranged in parallel groups of serial pipelines, each of the serial pipelines applying a portion of the packet modification template within at least a first stage and a second stage in each of the serial pipelines.

Example 48 is an edge computing system, comprising a plurality of edge computing nodes, the plurality of edge computing nodes configured with the template packet processing operations or circuitry of any of Examples 1-47.

Example 49 is an edge computing node, operable in an edge computing system, comprising processing circuitry configured to implement the template packet processing operations or circuitry of any of Examples 1-47.

Example 50 is an edge computing node, operable as a server or client in an edge computing system, configured to implement the template packet processing operations or circuitry of any of Examples 1-47.

Example 51 is an edge computing node, operable in a layer of an edge computing network as an aggregation node, network hub node, gateway node, or core data processing node, configured to implement the template packet processing operations or circuitry of any of Examples 1-47.

Example 52 is an edge computing network, comprising networking and processing components configured to provide or operate a communications network, configured to implement the template packet processing operations or circuitry of any of Examples 1-47.

Example 53 is an access point, base station, or roadside unit, comprising networking and processing components configured to provide or operate a communications network, configured to implement the template packet processing operations or circuitry of any of Examples 1-47.

Example 54 is a 3GPP 4G/LTE mobile wireless communications system, comprising networking and processing components configured with the template packet processing operations or circuitry of any of Examples 1-47.

Example 55 is a 5G network mobile wireless communications system, comprising networking and processing components configured with the template packet processing operations or circuitry of any of Examples of 1-47.

Example 56 is a user equipment device, comprising networking and processing circuitry, configured to connect with a networking system configured to implement the template packet processing operations or circuitry of any of Examples 1-47.

Example 57 is an edge computing system comprising processing circuitry, the edge computing system configured to implement the template packet processing operations or circuitry of any of Examples 1-47.

Example 58 is networking hardware with network functions implemented thereupon, configured to implement the template packet processing operations or circuitry of any of Examples 1-47.

Example 59 is computation hardware with compute capabilities implemented thereupon, configured to implement the template packet processing operations or circuitry of any of Examples 1-47.

Example 60 is an edge computing system adapted for supporting vehicle-to-vehicle (V2V), vehicle-to-every thing (V2X), or vehicle-to-infrastructure (V21) scenarios, configured to implement the template packet processing operations or circuitry of any of Examples 1-47.

Example 61 is an edge computing system adapted for operating according to one or more European Telecommunications Standards Institute (ETSI) Multi-Access Edge Computing (MEC) specifications, configured to implement the template packet processing operations or circuitry of any of Examples 1-47.

Example 62 is an edge computing system adapted for operating one or more multi-access edge computing (MEC) components, the MEC components provided from one or more of: a MEC proxy, a MEC application orchestrator, a MEC application, a MEC platform, or a MEC service, according to a European Telecommunications Standards Institute (ETST) Multi-Access Edge Computing (MEC) configuration, the system configured to configured to implement the template packet processing operations or circuitry of any of Examples 1-47.

Example 63 is an edge computing system configured to implement template packet processing operations or circuitry of any of Examples 1-47 with use cases provided from one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 64 is a cloud computing system, comprising data servers operating respective cloud services, the respective cloud services configured to coordinate with an edge computing system configured to implement the template packet processing operations or circuitry of any of Examples 1-47.

Example 65 is a server, comprising hardware to operate cloudlet, edgelet, or applet services, the services configured to coordinate with an edge computing system configured to implement the template packet processing operations or circuitry of any of Examples 1-47.

Example 66 is an edge node in an edge computing system, comprising one or more devices with at least one processor and memory configured to implement the template packet processing operations or circuitry of any of Examples 1-47.

Example 67 is a set of distributed edge nodes, distributed among a network layer of an edge computing system, the network layer comprising a close edge, local edge, enterprise edge, on-premise edge, near edge, middle, edge, or far edge network layer, configured to implement the template packet processing operations or circuitry of any of Examples 1-47.

Example 68 is an apparatus of an edge computing system comprising: one or more processors and one or more computer-readable media comprising instructions that, when executed by the one or more processors, cause the one or more processors to implement the template packet processing operations or circuitry of any of Examples 1-47.

Example 69 is one or more computer-readable storage media comprising instructions to cause an electronic device of a computing or networking system, upon execution of the instructions by one or more processors of the electronic device, to implement the template packet processing operations or circuitry of any of Examples 1-47.

Example 70 is a communication signal communicated in a computing system or network, adapted by the template packet processing operations or circuitry of any of Examples 1-47.

Example 71 is a data structure communicated in a computing system or network, the data structure comprising a datagram, packet, frame, segment, protocol data unit (PDU), or message, the data structure adapted by the template packet processing operations or circuitry of Examples 1-47.

Example 72 is a signal communicated in a computing system, the signal encoded with a datagram, packet, frame, segment, protocol data unit (PDU), message, or data to perform or implement any of the template packet processing operations or circuitry of Examples 1-47.

Example 73 is an electromagnetic signal communicated in a computing or networking system, the electromagnetic signal carrying computer-readable instructions, wherein execution of the computer-readable instructions by one or more processors causes the one or more processors to perform or implement any of the template packet processing operations or circuitry of Examples 1-47.

Example 74 is a computer program used in a computing or networking system, the computer program comprising instructions, wherein execution of the program by a processing element in the computing or networking system is to cause the processing element to perform or implement any of the template packet processing operations or circuitry of Examples 1-47.

Example 75 is an apparatus of an edge computing system comprising means to perform or implement any of the template packet processing operations or circuitry of Examples 1-47.

Example 76 is an apparatus of a computing system or networking system comprising logic, modules, or circuitry to perform or implement any of the template packet processing operations or circuitry of Examples 1-47.

Example 77 is at least one machine-readable medium including instructions that, when executed by circuitry, cause the circuitry to perform operations to implement any of Examples 1-76.

Example 78 is an apparatus comprising means to implement any of Examples 1-76.

Example 79 is a system to implement any of Examples 1-76.

Example 80 is a method to implement any of Examples 1-76.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. A device, comprising:
   a network interface to receive a stream of packets;
   an arithmetic logic unit (ALU) to provide a same ALU that determines at least one command to modify the stream of packets;
   a command template store to provide a packet modification template, the packet modification template providing the at least one command to insert content within the stream of packets and change the stream of packets according to an output format of a network protocol; and
   circuitry comprising a plurality of processing components connected to the same ALU and the command template store, the plurality of processing components arranged in parallel groups of serial pipelines, each of the serial pipelines including at least a first stage and a second stage,
   wherein processing components in the first stage and the second stage use parameters received from the same ALU to modify the stream of packets based on the packet modification template.

2. The device of claim 1, wherein the packet modification template provided from the command template store comprises a network command and a corresponding substitute command, wherein the substitute command uses the received parameters from the same ALU to revise the network command, and wherein the revised network command is used to modify the packets.

3. The device of claim 2, wherein the network command is a generalized command structure.

4. The device of claim 2, wherein the network command is related to a type of packet being processed from the stream of packets.

5. The device of claim 1, wherein the same ALU is the sole ALU in the device.

6. The device of claim 1, wherein a first processing component in the first stage outputs a revised packet for each of the packets of the stream of packets based on the at least one command in the packet modification template, and a second processing component in the second stage receives the revised packet for each of the packets of the stream of packets and further modifies the revised packet based on the at least one command in the packet modification template.

7. The device of claim 1, wherein a first processing component in the first stage outputs a revised packet for each of the packets of the stream of packets being processed based on the at least one command in the packet modification template, and a second processing component in the second stage receives the revised packet for each of the packets of the stream of packets being processed and further modifies the revised packet based on a second packet modification template received from the command template store.

8. The device of claim 1, wherein each of the processing components in the first stage operate on a same type of packet provided according to a network communication protocol.

9. The device of claim 1, wherein the device is deployed in network processing hardware or on-board processing circuitry of a low-earth orbit satellite vehicle.

10. The device of claim 1, wherein the stream of packets are of a first type of network communication protocol, and the plurality of processing components are used to convert the stream of packets to a second type of network communication protocol.

11. The device of claim 1, wherein the command template store provides at least one packet modification template for pre-determined routing protocols used with satellite-based networking.

12. The device of claim 1, wherein the circuitry is provided by an application-specific integrated circuit (ASIC) or Field-programmable gate array (FPGA).

13. The device of claim 1, wherein the plurality of processing components comprise a plurality of network processors, and wherein the plurality of processing components in the first stage and the second stage use parameters received from the same ALU at a substantially simultaneous time.

14. Network packet processing circuitry, comprising at least one integrated circuit configured to:
obtain an instance of a stream of packets;
obtain an instance of a packet modification template, the packet modification template providing at least one command to insert content within the packets and change the stream of packets according to an output format of a network protocol;
receive parameters, the parameters to modify the packet modification template, wherein the parameters are received from a same arithmetic logic unit (ALU) that determines the at least one command to modify the stream of packets; and
apply the packet modification template to modify the stream of packets, wherein application of the packet modification template is performed using a plurality of processing components that are connected to the same ALU and arranged in parallel groups of serial pipelines, each of the serial pipelines applying a portion of the packet modification template within at least a first stage and a second stage in each of the serial pipelines.

15. The network packet processing circuitry of claim 14, wherein the packet modification template comprises a network command and a corresponding substitute command, wherein the substitute command uses the received parameters from the same ALU to revise the network command, and wherein the revised network command is used to modify the packets.

16. The network packet processing circuitry of claim 14, wherein the ALU is the sole ALU used with the network packet processing circuitry.

17. The network packet processing circuitry of claim 14, wherein a first processing component in the first stage outputs a revised packet for each of the packets of the stream of packets being processed based on the commands in the packet modification template, and a second processing component in the second stage receives the revised packet for each of the packets of the stream of packets being processed and further modifies the revised packet based on a second packet modification template.

18. The network packet processing circuitry of claim 14, wherein each of the processing components in the first stage operate on a same type of packet provided according to a network communication protocol.

19. The network packet processing circuitry of claim 14, wherein the stream of packets are of a first type of network communication protocol, and the plurality of processing components are used to convert the stream of packets to a second type of network communication protocol.

20. At least one non-transitory machine-readable storage medium comprising instructions stored thereupon, which when executed by network packet processing circuitry, configure the network packet processing circuitry:
receive a stream of packets;
access a packet modification template, the packet modification template providing at least one command to insert content within the packets and change the stream of packets according to an output format of a network protocol;
receive parameters, the parameters to modify the packet modification template, wherein the parameters are received from a same arithmetic logic unit (ALU) that determines the at least one command to modify the stream of packets; and
apply the packet modification template to modify the stream of packets, wherein application of the packet modification template is performed using a plurality of processing components that are connected to the same ALU and arranged in parallel groups of serial pipelines, each of the serial pipelines applying a portion of the packet modification template within at least a first stage and a second stage in each of the serial pipelines.

21. The machine-readable storage medium of claim 20, wherein the packet modification template comprises a network command and a corresponding substitute command, wherein the substitute command uses the received parameters from the same ALU to revise the network command, and wherein the revised network command is used to modify the packets.

22. The machine-readable storage medium of claim 20, wherein the ALU is the sole ALU used with the network packet processing circuitry.

23. The machine-readable storage medium of claim 20, wherein a first processing component in the first stage outputs a revised packet for each of the packets of the stream of packets being processed based on the commands in the packet modification template, and a second processing component in the second stage receives the revised packet for each of the packets of the stream of packets being processed and further modifies the revised packet based on a second packet modification template.

24. The machine-readable storage medium of claim 20, wherein each of the processing components in the first stage operate on a same type of packet provided according to a network communication protocol.

25. The machine-readable storage medium of claim 20, wherein the stream of packets are of a first type of network communication protocol, and the plurality of processing components are used to convert the stream of packets to a second type of network communication protocol.

* * * * *